United States Patent
Gregg et al.

[11] Patent Number: 5,948,060
[45] Date of Patent: Sep. 7, 1999

[54] SPEEDING-UP COMMUNICATION RATES ON LINKS TRANSFERRING DATA STRUCTURES BY A METHOD OF HANDING SCATTER/GATHER OF STORAGE BLOCKS IN COMMANDED COMPUTER SYSTEMS

[75] Inventors: Thomas Anthony Gregg, Highland; Kulwant Mundra Pandey, LaGrangeville, both of N.Y.

[73] Assignee: International Business Machines Corporation, Armonk, N.Y.

[21] Appl. No.: 08/788,755

[22] Filed: Jan. 24, 1997

[51] Int. Cl.⁶ .................................................... G06F 13/00
[52] U.S. Cl. ........................ 709/212; 709/200; 709/227; 709/228; 709/235
[58] Field of Search ........................... 395/200.3–200.33, 395/200.42–200.43, 200.57–200.58, 200.62, 200.66, 200.68; 371/32–35; 709/200–203, 212–213, 227–228, 232, 236–238

[56] References Cited

U.S. PATENT DOCUMENTS

| | | | |
|---|---|---|---|
| 5,327,570 | 7/1994 | Foster et al. | 395/200.43 |
| 5,339,427 | 8/1994 | Elko et al. | 395/673 |
| 5,357,608 | 10/1994 | Bartow et al. | 395/200.57 |
| 5,363,484 | 11/1994 | Desnoyers et al. | 395/200.42 |
| 5,377,337 | 12/1994 | Antonini et al. | 395/670 |
| 5,455,831 | 10/1995 | Bartow et al. | 371/1 |
| 5,463,736 | 10/1995 | Elko et al. | 395/200.38 |
| 5,509,122 | 4/1996 | Bartow et al. | 395/200.57 |
| 5,537,574 | 7/1996 | Elko et al. | 711/141 |
| 5,561,809 | 10/1996 | Elko et al. | 395/200.43 |
| 5,572,678 | 11/1996 | Homma et al. | 395/200.57 |
| 5,574,945 | 11/1996 | Elko et al. | 395/825 |
| 5,581,705 | 12/1996 | Passint et al. | 395/200.3 |
| 5,592,628 | 1/1997 | Ueno et al. | 395/200.3 |
| 5,629,948 | 5/1997 | Hagiwara et al. | 371/32 |
| 5,659,690 | 8/1997 | Stuber et al. | 395/309 |
| 5,708,769 | 1/1998 | Stallmo | 395/182.04 |

OTHER PUBLICATIONS

Kazama et al, "Novel Packet Transmission Scheme for Personal Communication Systems", 1994 Third Annual International Conference on Universal Personal Communications. Record (Cat. No. 94TH0622–1) pp. 516–520, Sep. 1994.

Elko et al, Specification and Drawings of Co-pending patent application Serial No. [08/147,697], Nov. 4, 1993.

*Primary Examiner*—Zarni Maung
*Assistant Examiner*—Bharat Barot
*Attorney, Agent, or Firm*—Marc A. Ehrlich; Bernard M. Goldman

[57] ABSTRACT

Speeds up a commanded system to read or write data for a large number of data frames transmitted on a link by executing a TRANSFER STRUCTURE instruction that automatically controls the reading or writing of a large number of scattered storage blocks in the storage of the commanded system containing, or to contain, the data transmitted on the link.

8 Claims, 11 Drawing Sheets

SPEEDING-UP COMMUNICATION RATES ON LINKS TRANSFERRING DATA STRUCTURES BY A METHOD OF HANDING SCATTER/GATHER OF STORAGE BLOCKS IN COMMANDED COMPUTER SYSTEMS

FIELD OF THE INVENTION

This invention generally relates to speeding-up the transfer of data on a communication link between two computer systems, in which a commanding computer system sends over the link a command to a commanded computer system to write or read a data structure transferred over the link from or to the commanding computer system.

More particularly, this invention teaches a single-move method of block handling in the commanded system for writing or reading the transferred data structure.

CROSS REFERENCE TO BACKGROUND APPLICATIONS

The following applications contain subject matter which is background, or related, to the subject application, as follows:

Entitled "Configurable, Recoverable Parallel Bus" by N. G. Bartow et al, U.S. Ser. No. 07/839,657, filed Feb. 20, 1992, now U.S. Pat. No. 5,357,608; Entitled "Frame-Group Transmission And Reception For Parallel/Serial Buses", by N. G. Bartow et al, U.S. Ser. No. 07/839,986, filed Feb. 20, 1992, now U.S. Pat. No. 5,267,242; Entitled "Method and Apparatus for Distributed Locking of Shared Data, Employing a Central Coupling Facility" by D. A. Elko et al, U.S. Ser. No. 07/860,808, filed Mar. 30, 1992, now U.S. Pat. No. 5,339,427; Entitled "Communicating Messages Between Processors And A Coupling Facility" by D. A. Elko et al, U.S. Ser. No. 07/860,380, filed Mar. 30, 1992, now abandoned; Entitled "Sysplex Shared Data Coherency Method and Means" by D. A. Elko et al, U.S. Ser. No. 07/860,805, filed Mar. 30, 1992, now U.S. Pat. No. 5,537,574; Entitled "Command Quiesce Function" by D. A. Elko et al, U.S. Ser. No. 07/860,330, filed Mar. 30, 1992, now U.S. Pat. No. 5,339,405; Entitled "Software Cache Management of a Shared Electronic Storage in a Sysplex" by D. A. Elko et al, U.S. Ser. No. 07/860,807, filed Mar. 30, 1992, now U.S. Pat. No. 5,457,793; Entitled "Multiple Processor System Having Software For Selecting Shared Cache Entries of an Associated Castout Class For Transfer to DASD with one I/O Operation" by D. A. Elko et al, U.S. Ser. No. 07/860,806, filed Mar. 30, 1992, now U.S. Pat. No. 5,443,668; Entitled "Execution System for Using First and Second Commands to Reserve and Store Second Estimated Related Status Information in Memory Position Respectively" by D. A. Elko et al, U.S. Ser. No. 07/860,378, filed Mar. 30, 1992, now U.S. Pat. No. 5,392,397; Entitled "Integrity Of Data Objects Used To Maintain State Information For Shared Data At A Local Complex" by D. A. Elko et al, U.S. Ser. No. 07/860,800, filed Mar. 30, 1992, now U.S. Pat. No. 5,331,673; Entitled "Management Of Data Objects Used To Maintain State Information For Shared Data At A Local Complex" by J. A. Frey et al, U.S. Ser. No. 07/860,797, filed Mar. 30, 1992, now U.S. Pat. No. 5,388,266; Entitled "Clearing Of Data Objects Used To Maintain State Information For Shared Data At A Local Complex When At Least One Message Path to the Local Complex Cannot be Recovered" by J. A. Frey et al, U.S. Ser. No. 07/860,647, filed Mar. 30, 1992, now U.S. Pat. No. 5,399,542; Entitled "Press-Contact Type Electric Connector For a Flat, Flexible Cable" by D. A. Elko et al, U.S. Ser. No. 07/860,846, filed Mar. 30, 1992, now U.S. Pat. No. 5,181,854; Entitled "Data Processing System and Method For Providing Notification to a Central Processor Of State Changes for Shared Data Structure on External Storage" by J. A. Frey et al., U.S. Ser. No. 07/860,809, filed Mar. 30, 1992, now U.S. Pat. No. 5,390,328; Entitled "Method And Apparatus For Performing Conditional Operations on Externally Shared Data" by J. A. Frey et al., U.S. Ser. No. 07/860,655, filed Mar. 30, 1992, now abandoned; Entitled "Apparatus And Method For List Management In A Coupled Data Processing System" by J. A. Frey et al., U.S. Ser. No. 07/860,633, filed Mar. 30, 1992, now U.S. Pat. No. 5,410,595; Entitled "Interdicting I/O And Messaging Operations From Sending Central Processing Complex to other Central Processing Complex and to I/O Device In A Multi-System Complex" by D. A. Elko et al., U.S. Ser. No. 07/860,489, filed Mar. 30, 1992, now U.S. Pat. No. 5,394,554; Entitled "Method and Apparatus for Coupling Data Processing Systems" by D. A. Elko et al., U.S. Ser. No. 07/860,803, filed Mar. 30, 1992, now U.S. Pat. No. 5,317,739; Entitled "Apparatus and Method for Communication a Quiesce and Unquiesce State Between Elements or a Data Processing Complex", by Neil G. Bartow et al., U.S. Ser. No. 08/071,154, filed Jun. 1, 1993, now U.S. Pat. No. 5,451,738; Entitled "Configurable, Recoverable Parallel Bus", by Neil G. Bartow et al., U.S. Ser. No. 08/071,146, filed Jun. 1, 1993, now U.S. Pat. No. 5,509,122; Entitled "Frame Group Transmission and Reception for Parallel/Serial Buses", by Neil G. Bartow et al., U.S. Ser. No. 08/071,115, filed Jun. 1, 1993 and having a priority date of Feb. 20, 1992, now U.S. Pat. No. 5,455,831; Entitled "Concurrent Maintenance of Degraded Parallel/Serial Buses", by Kenneth J. Fredericks et al, U.S. Ser. No. 08/070,587, filed Jun. 1, 1993, now U.S. Pat. No. 5,418,939; Entitled "Null Words for Pacing Serial Links to Driver and Receiver Speeds", by Daniel F. Casper et al, U.S. Ser. No. 08/071,150, filed Jun. 1, 1993, now U.S. Pat. Nos. 5,548,623, 5,003,558 and 5,025,458 which relate to a channel for synchronizing and decoding of serial data transmission.

The above cited applications and patents are owned by the same assignee, International Business Machines Corporation of Armonk, N.Y., as the subject application.

BACKGROUND OF THE INVENTION

Most current computer systems store blocks of data bits in computer random access electronic storage, in which the bits are organized into groups usually called bytes or vectors. Many computers find it convenient to divide their random access storage into fixed length blocks having a length which is a power of two bits. The storage boundaries are located at real addresses which are usually a multiple of a power of the number two (2) defining the block length, in which each block is considered to begin on a storage boundary and to end on a next successive boundary. For example in mainframes using the IBM S/390 architecture, blocks are located on 32768 bit boundaries (e.g. 4096 byte boundaries), and in personal computers using the Intel computer architecture blocks may be located at 2048 or 4096 bit boundaries (e.g. 256 or 512 byte boundaries). Actually, the storage boundaries need not be located at bit locations which are a multiple of a power of two bits, but computer architectures have generally preferred using power of two boundaries, because it minimizes economic costs incurred in the manufacture and use of computer storage.

The choice of storage block length in a computer memory has generally been coordinated with the type and meaning of data to be stored in a computer, to minimize the expectation of unused storage at the ends of the stored blocks if the block size is chosen too large. Often computer instructions move data in block units within a storage or between storages, which may cause an excessive number of move operations for a given amount of data if the block size is chosen too small. The decision of block length in a given computer architecture is usually made in consideration of the way data is most frequently expected to be used.

The choice of a single storage block size may differ from one type of computer to another type of computer when their storages are expected to generally store different types of data, even when these computers may be using the same computer architecture. For example, this is the case with the IBM Coupling Facility (CF) used in a mainframe having up to a large number of mainframe electronic processing complexes (CPCs). The CF stores data primarily in software caches and lists, either or both of which may contain a very large amount of data (many gigabits) that occupy a large number of data blocks, either of which may operate in very small units so that a small block size of, for example, may be 512 bytes. On the other hand, the CPC is constrained by long use of a 4096 byte block length as its most frequently moved unit of storage by its operating system which uses the 4 KB block as its unit of virtual memory allocation and as its pageable unit between main storage and DASD.

Storage allocation prefers a fixed block length to minimize storage fragmentation. If a user requests a storage allocation requiring multiple storage blocks, the system must determine the location of the allocated blocks, and allow the user to use addresses for accessing the allocated blocks. Contiguous block locations are not feasible due to eventual storage fragmentation in the deallocation and reallocation of storage. If the user is to use non-contiguously allocated blocks (required to avoid storage fragmentation), the user will have non-contiguous real addresses in the allocated space, which is very awkward for the user. Virtual addressing was invented many decades ago to allow use of contiguous addresses in non-contiguous blocks.

Data structures of various types may be devised in a computer storage, and may involve various manners of assignment of blocks to data structures, regardless of whether real or virtual addressing is used in accessing the storage. When virtual addressing is used to access some or all of the blocks in a memory, usually one fixed length is use for all of these blocks. Contiguous virtual addresses may be used for accessing a plurality of blocks even though these blocks are located at scattered locations in storage. A page table is used to bind scattered blocks to a contiguous set of virtual addresses by using a page table or a plurality of page tables organized into a segment table. A contiguous set of virtual addresses may be mapped by the page table(s) into a range, which may have an address range beginning at virtual byte address zero and ending at a very large byte virtual address (e.g. 2 GB). Such a range of virtual addresses (e.g. defined by a segment table) may be called a virtual address space. Plural segment tables may be used to have a plurality of virtual address spaces in a computer system.

Data may be structured by identifying a set of the blocks in memory (whether they are located by virtual addresses, real addresses, or another method). One way of defining a data structure is by a table in memory that contains a sequence of pointers (e.g. real addresses) which may respectively locate a set of non-contiguous storage blocks scattered anywhere in storage.

Examples of data structure include tables, lists and queues. A list or queue has an anchor entry in storage which is chained to a set of storage blocks which may be located anywhere in storage (i.e. scattered), in which each block may contain a forward pointer to locate a next block in the set, and also each block may contain a backward pointer to locate the prior block in the structure. A characteristic of using storage blocks as units in a list is that due to the pointer(s) occupying space in each block in the list, less than a power of two remains in each block for data storage. A table may contain a list of sequential addresses which may point to blocks located anywhere in storage.

An example of a computer system which may be primarily used for storing list and cache data structures is the IBM Coupling Facility (CF). The block length in such a CF may be a submultiple of the 4KB block length used by CPCs connected through a link to the CF. This difference in block size can cause problems in communicating data structures between a CPC and a CF, because the same data structure will then have a different descriptions in these two environments due to their use of different block lengths.

The communication protocol between the CF and CPC allows the CF to store a data structure, i.e. list or cache, which may be changed by a command from any link-connected CPC which may communicate a command on the link to store or fetch all or part of a data structure in the CF. A data structure is communicated on the link by transmitting a sequence of data frames between the CF and CPC. The sequentially transmitted frames may contain blocks of a data structure, which may be scattered throughout the electronic storage of the CF or CPC. The same data structure may be scattered differently and may be stored in different length blocks in the CPC and CF storages (memories). As a result, the transmission of a data structure as a sequence of link frames may need to be handled differently by the computer systems at the opposite ends of a link (e.g. by the CPC and CF).

1. Prior Art Handling in the Commercial IBM CF of Link Frames Communicated Between a CPC and the CF:

In a CF, two separate and independent partial move operations were required to move data between each link frame and scattered block locations for a structure in the CF memory. These two move operations had to be separately initiated and repeated for each link frame transferred for a structure, as follows for a link transmission in either direction (send or receive):

A. One of the partial move operations (done by a "move channel buffer data" instruction) moved the data between a "link buffer" and a "staging buffer".

B. The other partial move operation (done by "an iterative CF block move program") moved the data between the staging buffer and the final scattered block locations for the data structure in the CF memory.

C. An interrupt, or polling, operation occurred on the completion of the first partial move operation to communicate to the CF processor when it should start the second partial move operation.

D. After the second move operation was completed, either an "acknowledge" or a "reject" signal was sent on the link by the receiving system to the sending system. Receipt of an "acknowledge" signal enabled the sending system to transmit any next link frame if more data remains to be transmitted for the current data structure. Receipt of a "reject" signal required the sending system to retransmit the data frame to which the reject applied. Thus, each next link frame could not be transmitted until the "acknowledge" signal was accepted for the last link frame.

E. An opposite order occurs for the two partial moves described in A and B above, according to whether a CF write operation or a CF read operation was being performed, and each type of operation required an interruption, or polling, signal, as follows:
   1) For a CF write operation, each CPC-sent link frame, which when received by the CF link buffer, was partially moved from the link buffer to the staging buffer by a CF "move channel buffer data" instruction. The "move channel buffer data" instruction was an asynchronous instruction, and the CF processor did not know when it completed moving the data into the staging buffer. The signal was presented to the CF processor when this partial first move was completed to signal that the second partial move should be started from the staging buffer to the final block locations scattered in CF memory (done by a CF processor move program).
   2) For a CF read operation, each CPC-requested data frame was first moved from a scattered block location in the structure in CF memory to the staging buffer by a "CF processor move program". Then, the "CF processor move program" started the second partial move from the staging buffer to the link by a "move channel buffer data" instruction. Since "move channel buffer data" instruction was an asynchronous instruction, the CF processor did not know when it completed its link transmission operation. Therefore the "move channel buffer data" instruction generated a completion interruption signal, or completion polling signal, to inform the CFCC program that it could start preparation for the transmission of the next block.

SUMMARY OF THE INVENTION

It is a primary object of the subject invention to significantly speed-up the effective link transfer rate for communicating link frames of data between a commanding computer system (originating the command) system and a commanded computer system (recipient of the command).

It is another object of the subject invention to provide a method and mechanism that reduces transmission delays and increases processor utilization in handling a data structure being written, or read, at a commanded computing system.

It is still another object of the subject invention to allow prior link protocols, especially in link error recovery procedures, to be used with new more efficient block handling operations provided by the subject invention to assure inter-operability between the subject invention and the prior link protocols.

It is a further objective of this invention to enable the same link adapter hardware to be used at opposite ends of a link for connecting two computer system but to be able to be used differently at the opposite link ends to control an automatic transmission of a data structure by multiple data frames without interruption between the data frames for the structure.

It is another objective of this invention to provide link adapter hardware embodiable in a semiconductor chip which may be used at each end of a link for containing a collection of address registers, pointers, counters, etc. to contain and decrement/increment addresses and parameters for controlling a single direct move operation of data blocks between link-transmitted frames and block locations scattered in the memory of a respective computer system connected to the link.

It is yet another objective of the present invention to provide a mechanism for backing up (or decrementing) a list pointer in the link adapter hardware to control a retransmission or reception of a link frame that was indicated to have a potential error condition.

It is a further objective of the present invention to provide a new processor instruction, TRANSFER STRUCTURE, for use by a commanded computer system, such as a CF, connected to a link to enable the commanded system to perform a single internal move operation for each link frame of a data structure without interruption. A single execution of the TRANSFER STRUCTURE instruction handles the link transfers of any number of scattered blocks in a data structure requested in either direction on the link, as requested by a single command from the commanding system.

This invention approximately doubles the effective data transfer speed for transmitting link frames for a data structure in either direction on a link connecting two computer systems—when compared to a currently used prior art intersystem channel link transmission method using a link with the same data bit transmission rate.

This invention obtains the large increase in the transmission rate even though the data of a structure may be stored differently in the memories of the communicating computer systems, such as storing the data in blocks in one computer system having a different length from the blocks in the memory of the other computer system, and even though the blocks in either computer system are located at different real addresses than in the blocks for the same structure in the other computer system (e.g. scattered blocks).

The invention reduces the costs for the commanded computer system (the system receiving a transmission control command), such as a CF computer system receiving a transmission command from a CPC. The cost reduction occurs by reducing the resources in the commanded-system needed for controlling a transmission of link frames for a data structure, e.g. on a CPC/CF link—at the same time that this invention is greatly increasing the effective data transfer speed of the link frames. The cost reduction includes the elimination of: a staging buffer, reduction in processing time by the elimination of the prior multiple partial move operations that used the staging buffer, and the elimination of prior move-control interruptions to, or polling by, a CF processor for each transferred link frame.

This invention further reduces the cost of operation of a commanded-system (e.g. CF) by increasing the utilization of the processor in the commanded computer system. This cost reduction results from a single execution of the novel TS instruction provided by this invention to control all data movement between all link frames and all of the scattered blocks for containing a data-structure in the memory of a commanded-system—replacing the need for a prior art method requiring multiple executions of a partial-move program (containing a large number of instruction) and multiple executions of a prior "move channel buffer data" instruction; one execution of the program and of the instruction for each transmitted data frame.

The following paragraphs 1 through 4 summarize features of this invention:
   1. This specification discloses a single move operation per link frame between a link receive/send buffer and the scattered blocks of a data structure in the memory of a link-commanded computer system, such as a CF.
   2. The single move operation occurs without any interruption, or polling, during or between the handling of received link frames for an entire structure regardless of the number of link frames transmitted for the structure. (The prior art required an interruption (between its two partial moves for each transmitted data frame.)

3. This invention transmits an "acknowledge" or "reject" signal to the sender in much less than the time required by the prior art method, for the same data block transmission without changing the bit transmission rate of the link. (This is because the subject invention sends its acknowledge signal at the end of a single move operation without any interruption delay. (The prior art method sent its "acknowledge" signal after two partial move operations with an intervening interruption, or polling, delay needed to coordinate two partial move operations.)

4. This invention provides a novel "transfer structure" (TS) instruction for use by a commanded computer system, such as a CF processor. A single execution of this TS instruction operates for any number of link frames transmitted for a structure to move the data for all link frames and all scattered locations for a transmitted structure in the memory of the commanded computer system. (The prior art method used the "move channel buffer data" instruction to move the data of only a single link frame which usually was a small part of a data structure in the memory of the commanded computer system; and a time-consuming number of executions had to be made of the "move channel buffer data" instruction equal to the number of link frames transmitted for a structure.

Before executing the Transfer Structure instruction, the commanded computer system executes a program that prepares a pointer list containing the addresses of data blocks in the data structure in the memory of the commanded computer system. The processor also pre-prepares parameters needed by the TS instruction, such as describing a ratio of data block lengths used in storing the structure in the memories of the commanding and commanded computer systems, a count of the number of data blocks in the structure in each memory, the location of a list of pointers to the scattered blocks in the structure, the number of pointers in the list of pointers, etc.

When bit errors are detected in any received link block, this invention supports a novel method enabling backing up the current pointer in the list to control a resend of the erroneous data frame, and a re-receiving of the sent data, when different length blocks are being used for the data structure in the commanding and commanded systems—to enable prior recovery link protocols to be used when an error condition is detected for a transmitted link frame.

In a preferred embodiment of the present invention, a coupling facility (CF) is the commanded computer system at one end of a link, and a central processing complex (CPC) is the commanding computer system at the other end of the link that requests a structure write or read operation in the CF. Thus the CPC issues a write command on the link to the CF requesting the CF to store in the CF memory a data structure, or part of a structure, being sent by the CPC on the link as a set of data frames to the CF. And, the CPC issues a read command on the link to the CF for requesting the CF to read a structure, or part of a structure, stored in the CF memory and to be sent by the CF as a set of data frames on the link to the CPC.

The invention synchronizes a multi-block transfer of a set of blocks in a commanded system by means of "acknowledge" (ACK) frames and "reject" (REJ) frames transferred between a commanding system and the commanded system without an interruption being caused to the commanded system by either an ACK or REJ frame sent (write operation) or received (read operation) by it. The commanding system need not be aware that the commanded system is using this invention. The invention executes a "TRANSFER STRUCTURE" (TS) instruction to control and synchronize the commanded systems operations during execution of this instruction.

A single TS instruction executes for transferring an entire set of blocks (herein generally called a structure) which generally has a variable number of blocks. The single execution of a TS instruction is controlled by a block address pointer list (called an SBAL in the preferred embodiment) in a memory of the commanded system, which has a pointer entry for each storage block in the set in the commanded system's storage.

The frame transfer on the link is in either direction supporting both the read and write function in the commanded system. The ACK or REJ frame (responding to the receipt of each data frame) is sent in either direction in the link (from the system receiving the associated data frame to the system transmitting the data frame), so that either the commanding or commanded system may send the ACK or REJ frame, and the other system will receive it. Nevertheless, the commanded system data frame transmissions of this invention are controlled by the ACK and REJ frames at the commanded system, whether the commanded system sends them for a write operation or receives them for a read operation.

The execution of the TS instruction is initiated by a control frame sent on a link to the commanded system, and continues without interruption until a last block of the set is received (which may be indicated by a count sent in the control frame and decremented by the commanding system as it transfers data frames for the set, which is either being written or fetched in the commanded system as indicated in the control frame. The transmission of each following data frame at the commanded system in either link direction is controlled by the ACK or REJ frame responding to the last data frame. An ACK frame causes the transmission of next data frame.

However particularly unique to this invention is the commanded system's response to a REJ frame, which causes a re-transmission of the last data frame, which may contain more than one storage block in the commanded system storage (memory) which the latter is smaller than the block length in the commanding system storage (memory). If the commanded system block length is larger than the block length in the commanding system, the commanded system controls a retransmission of a fraction of its last transmitted block.

Thus this invention supports different storage block lengths in the commanded and commanding system storages by having the initial control frame send an indicator stating the relationship between the the commanding and commanded storage block lengths, which may be their ratios.

Accordingly, a single execution of a TS instruction at a commanded system may involve the link transmission of a very large number of data blocks, including one or more re-transmissions of any one or more of the blocks in the set that received a REJ frame response, i.e. one re-transmission for each REJ transmitted in either direction. No prior link transmission system is known to have this REJ operation capability.

The invention operates fastest if the ACK and REJ frames do not cause an interruption at the commanded system, such as where a processor is dedicated to the link transmission operations by the TS instruction. However if a commanded system does use interrupts for its ACK and/or REJ frame transmissions, the invention still operates significantly faster than prior systems due to its transmission control method avoiding use of partial moves through a stagging buffer and avoiding the interruptions used for controlling those partial moves.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings which are:

DETAILED DESCRIPTION OF THE PREFERRED EMBODIMENT

The preferred embodiment is described below in four parts: A. B, C and D. The first part A describes the link protocols used to transmit messages between computers. The second part B describes the message passing hardware and operation of a central processing complex (CPC), which is the system issuing a command to send or receive a data structure. The third part C describes the message passing hardware and operation of the coupling facility (CF), which is the system receiving the command from a CPC requesting the CF to write a received data structure or read a data structure previously stored in the CF. The last part D describes recovery from link bit errors.

The preferred embodiment uses the same link adapter hardware in both the CPC and the CF, but this hardware is operated in different ways for the CPC and CF.

The term "address" and "pointer" are each herein used to mean a field designating a location in a memory, including a real, virtual, direct or indirect address. Either indirect or virtual addressing could be used.

DESCRIPTION OF THE LINK PROTOCOLS FOR MESSAGE PASSING

Figure 1:
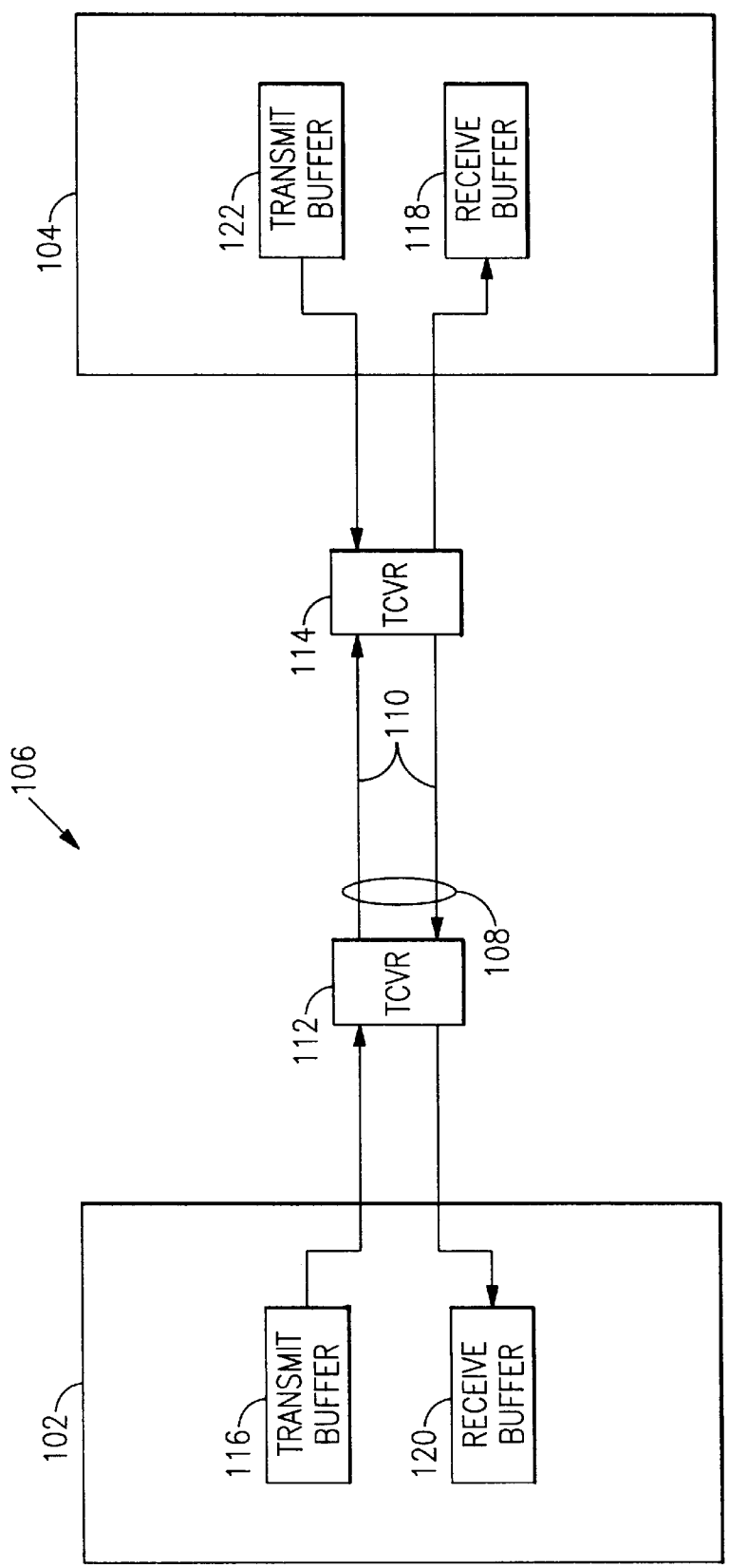
FIG. 1 is a block diagram of a physical link between two computing systems.

Turning first to FIG. 1, a physical link for communicating data between two computing elements 102, 104 is illustrated. The term, computing element, includes a computer memory shared by other computer elements. In any event, the computing elements 102, 104 are connected by way of an intersystem channel link 106 comprising a fiber optic bus 108. The fiber optic bus 108 is formed of a fiber pair 110. A fiber pair consists of two optical fibers, one for transmitting data from 102 to 104, and the other for transmitting data from 104 to 102. The fiber pair 110 is coupled to the computing elements 102, 104 by way of transceivers 112, 114 located at opposite ends of the link. Each of the transceivers 112, 114 includes a transmitter unit and a receiver unit.

All of the data traffic over the fiber optic bus 108 supports message passing between the computing elements 102, 104. One type of message is a command sent from computing element 102 to computing element 104 requesting a read or write operation by 104. This invention deals with data associated with the command request and the data is either sent from computing element 102 to computing element 104 (a write operation in element 104), or from computing element 104 to computing element 102 (a read operation in element 104).

After the data is transferred, a response is sent from the commanded computing element 104 to commanding computing element 102. The messages, consisting of command requests, data, and responses are stored in buffers located in both computing elements. To transfer a request, data, or response, transmit buffers 116 and 122 and receive buffers 118 and 120 are required in the computing elements 102 and 104. It should be understood that the transmitting buffers 116 and 122 may be located anywhere in the transmitting computing elements 102 and 104, including the main processor memory. It should be further understood that the receive buffers 118 and 120 must at all times be immediately accessible by the transceivers 112 and 114.

Therefore, the receive buffers 118 and 120 are usually implemented as storage arrays dedicated to the channel, and they are not in main processor memory where access is shared among many different elements within the computing elements 102 and 104.

Figure 2:
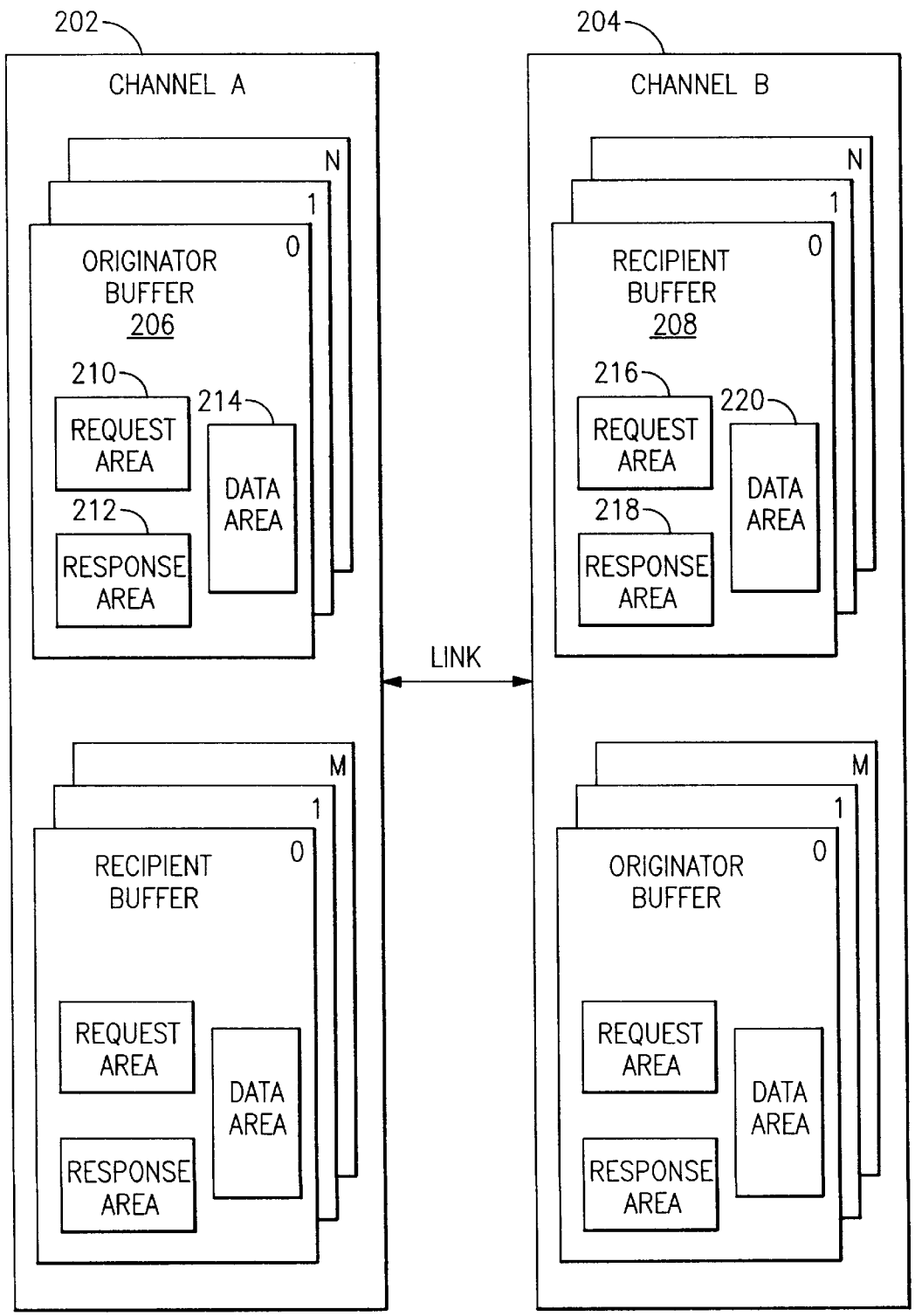
FIG. 2 is an illustration of a multimessage channel buffer structure.

To process a complete message with data requires the use of buffers in both computing elements 102, 104. The computing element that initiates the message is the originator, and the computing element that processes the message is the recipient. FIG. 2 shows multiple buffers on both sides of a bidirectional link. For example, to pass a message with data from Channel A 202 to Channel B 204 requires the use of Channel A originator buffers 0–N shown in block 206 and the Channel B recipient buffers 0–N shown in block 208. Each group of buffers in sets 206, 208 is called a "buffer set." When a message is sent, an originator buffer request area 210 is loaded with a command request, and the request is sent over the link to a recipient buffer request area 216. If data is to be transferred, it is either sent from originator buffer data area 214 to recipient buffer data area 220 for a write operation, or it is sent from recipient buffer data area 220 to originator buffer data area 214 for a read operation.

The length of each data buffer area can accommodate various link data block lengths, always powers of two, up to the full length of the buffer data area 214, 220. A data transfer may be required in response to a command request, sometimes requiring more than one link frame and more than one exchange on the link. After any data transfer is completed, a control response is loaded into the recipient buffer response area 218 and sent across the link to the originator buffer response area 212 of the commanding system to indicate if the command was completed successfully or not by the commanded system.

All information transferred from one side of the link to the other is contained in link frames transferred in either direction on the link. This information is always targeted to a particular buffer area, and the targeting information is contained in a link-control word in the frame. This targeting information allows the frames to be multiplexed over the link in any order. As an example in FIG. 2, Channel A could send a write command for buffer set 1 followed by write data frames for buffer set 0, followed by a control response for buffer set 0, etc. It should be understood that a computing element can dynamically set up various numbers of originator and/or recipient buffers depending on the number and type of links to be established.

Figure 3:
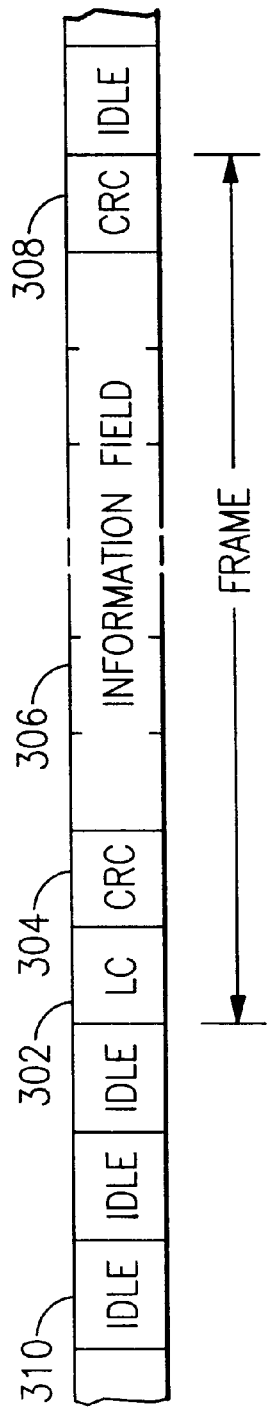
FIG. 3 is an illustration of the format of an exemplary link frame.
Figure 4:
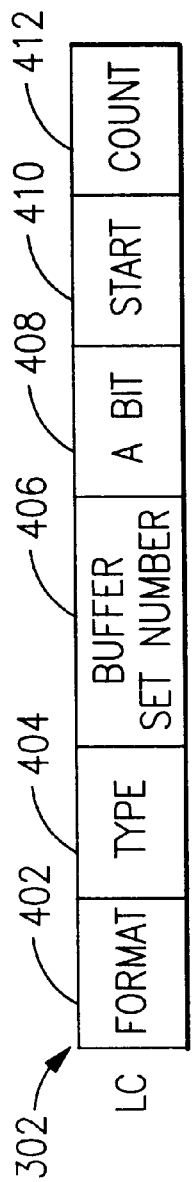
FIG. 4 is an illustration of the contents of the Link Control word in the link frame of FIG. 3.

The frame format used in this embodiment is illustrated in FIG. 3. When no frames are being transmitted, idle words 310 are continuously sent on the link. When frames are transmitted, they start with a data word which is the link-control word (LC) 302. FIG. 4 shows various fields in the link-control word 302 which identify the frame format and type, designate a buffer set area, and control the state of the transceiver and link.

The frame in FIG. 3 also has a link-control-CRC (cyclical redundancy check) word 304 following the link-control word. The link-control CRC word 304 is conventionally generated from the values in the link-control word. The link-control CRC word is checked at the receiver to test the validity of the link-control word in the incoming frame.

An information field 306 follows CRC field 304 and is followed by an information-field CRC word 308. The information-field CRC word is conventionally generated from the values in the information field 306. The information field CRC word is checked at the receiver to test the validity of the information field in the incoming frame.

There are two types of frames, control frames and information frames. Control frames do not have an information field. Some types of control frames consist only of a link-control word 302 and a link-control CRC word 304. An information frame has a link-control word 302, a link-control CRC word 304, an information field 306, and an information CRC word 308. Information field 306 contains, for example, from one to 1,024 words. The information field contains the information sent from a buffer set area at one end of the link to a buffer set area at the other end.

FIG. 4 shows details in the link-control word 302. A format 402 bit indicates whether or not the frame contains an information field 306. Command requests, responses, and data frames all have an information field, while acknowledgement frames and reject frames do not have an information field. The "type" field 404 specifies a request, response, or data frame. The buffer set number 406 specifies which buffer set is the target. The A bit 408 has two uses. In a command request frame, the A bit state indicates that data frame(s) are to follow (a write operation in the commanded system), and in a response frame, the A bit state indicates that data frame(s) preceded the response frame (a read operation). In a data frame, the A bit state indicates that more data frame(s) are to follow.

Information transferred to a particular buffer may be received from more than one frame. The first frame for a buffer area always has a Start 410 bit set to an on state in the LC word 302, and the on state of this bit indicates the validity of the Count in field 412. The Count indicates the total number of 256 byte groups that will be transferred to the buffer in one or more data frames, and this count does not indicate the length of the presently transmitted frame. The transmitter can end the frame with a CRC 308 word on any 256 byte boundary in the information field 306. When the transmitter resumes the transfer to the buffer, it starts the new frame with the Start bit 410 in the link-control word reset to zero. The zero value of the start bit indicates that this frame contains an information field which is a continuation of the information field in the previous frame targeted to the same buffer. The receiver knows that all of the information has been received when the total number of 256 byte groups transmitted in all of the frames have been received and satisfy the Count 410 transmitted in the link-control word of the first frame. A buffer area can be transmitted by any number of frames from one to the total number of 256 byte groups. For example, a 1024 byte buffer area can be transmitted in any number of frames from one to four.

Figure 5:
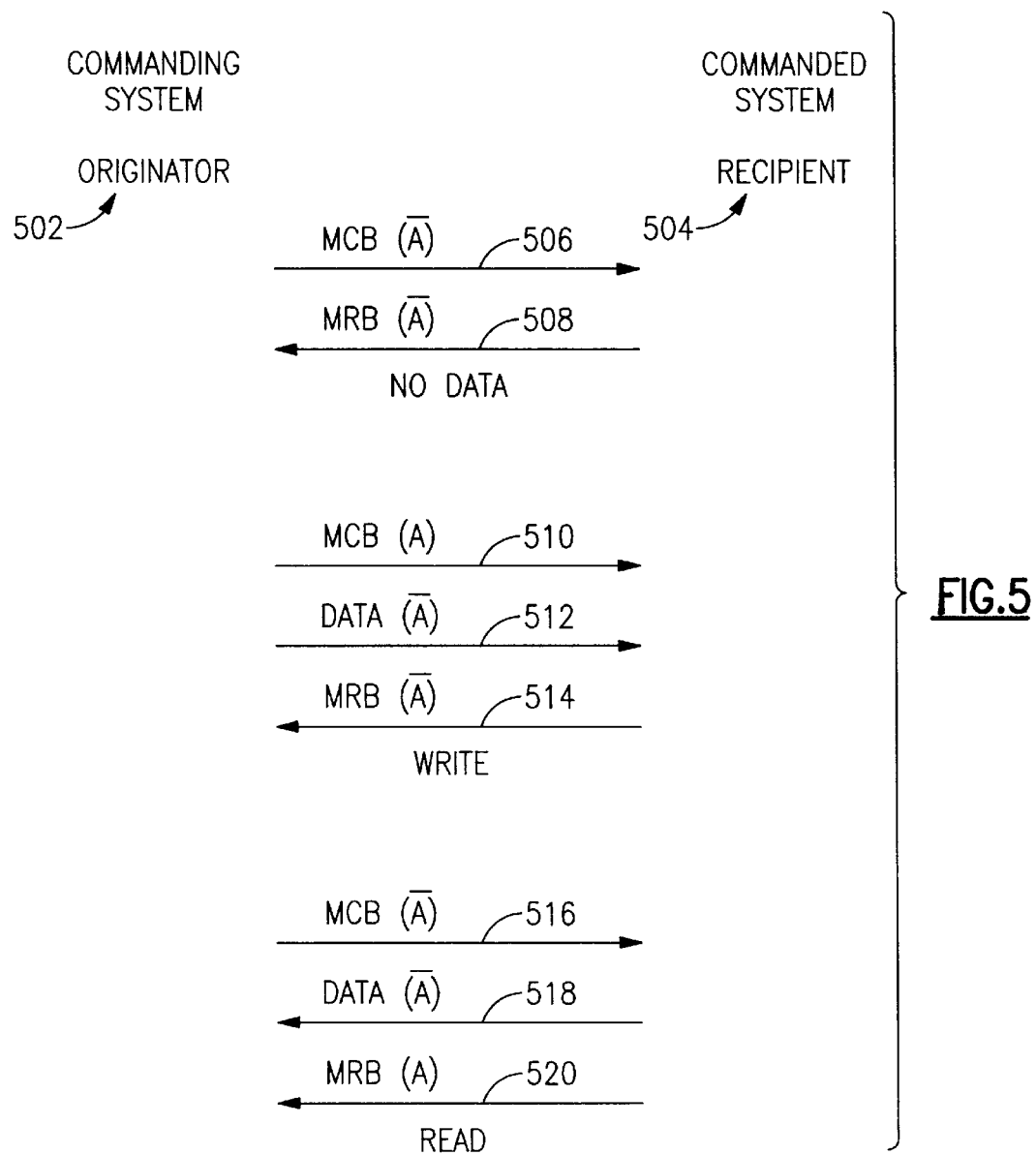
FIG. 5 is a representation of a sequence of frame transmissions including a command, data and response frame exchanges between two computing systems.
Figure 6:
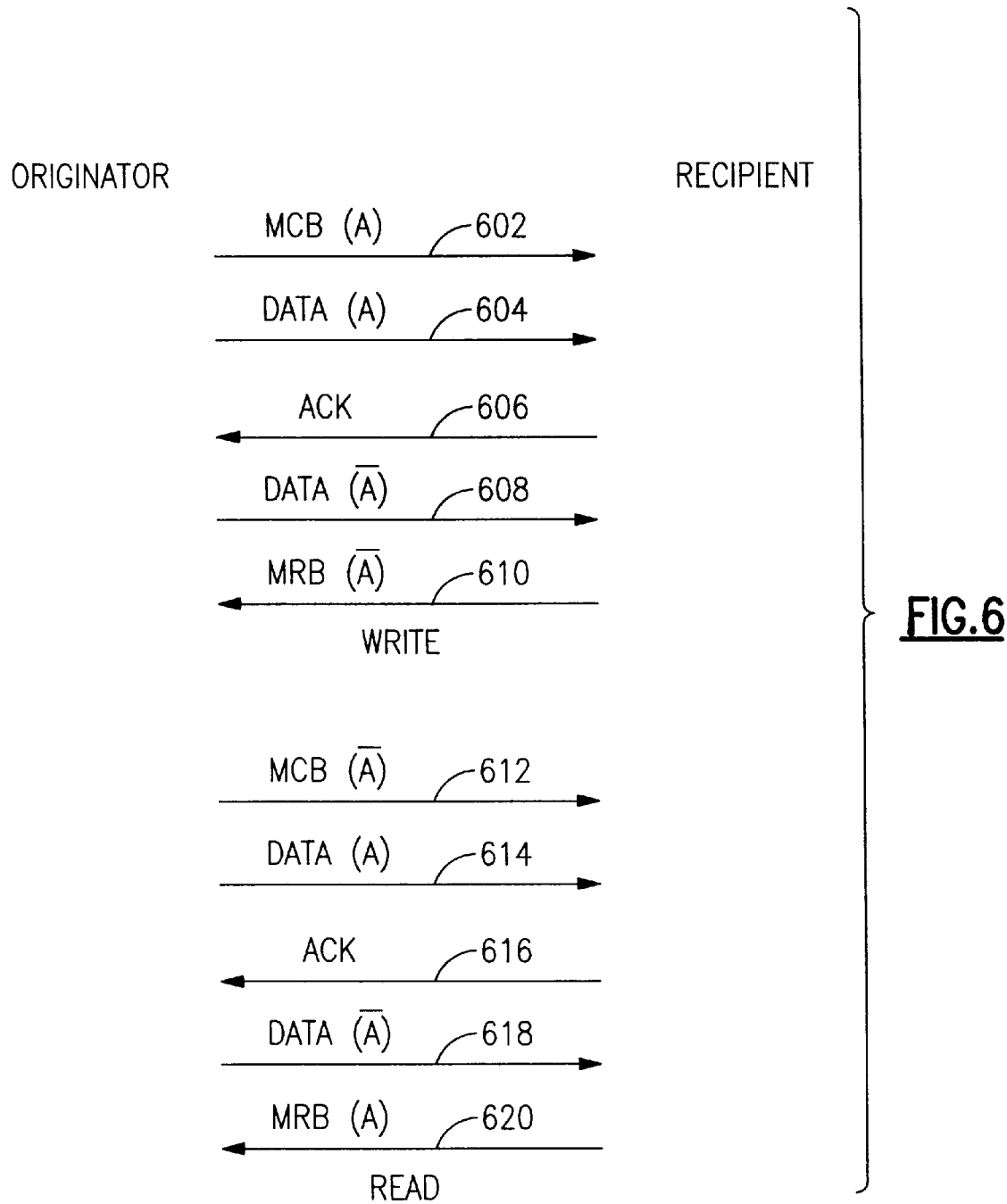
FIG. 6 is an representation of additional exchanges in a sequence of frame transmissions including a command, data and response frame exchanges in which multiple data frames are transmitted.

Although the embodiment does not provide sequence numbers, each frame is interlocked with subsequent and previous frames. The interlocking is accomplished by the protocol on the link. For example, each message for a particular buffer set starts with a command request frame, followed by data frame(s), followed by a response frame. Each of these types of frames has a unique link-control word since each frame may target a different buffer set area. FIGS. 5 and 6 illustrate the protocols.

FIG. 5 shows three operational examples. The first example is a "no information data" example which represents a command request frame and a response frame with no data transfer. In this example, the originator 502 (commanding system) sends the request in a Message Command Block (MCB) frame 506 to recipient system 504 (commanded system). The LC 302 for this frame has its A bit 408 set to zero since there is no data to follow. After the request frame has been processed, the recipient system 504 sends a response in a Message Response Block (MRB) frame 508. The LC for this frame also has the A bit set to zero since there was no data preceding the response frame.

The second example in FIG. 5 is a write operation in the recipient system of a single link data block. In this case the MCB frame 510 has the A bit set to one since there is at least one link data block to follow. After the MCB frame, the originator sends the link data block (DATA) 512. The A bit in this DATA frame is set to zero because there are no more link data blocks to follow. After the recipient processes the request frame and its associated data, it sends a response frame 514 containing an MRB. The A bit in the MRB frame is set to zero since there was no data frame preceding the response. The third and last example in FIG. 5 is a read operation having a single link data block frame. In this case the MCB frame 516 has the A bit set to zero since no data frame is to follow. The recipient system processes the request frame and returns a link data block (DATA) frame 518. The A bit in this DATA frame is set to zero because no more data areas are to follow. After the recipient system has sent the DATA frame, it sends the response (MRB) frame 520. The A bit in this MRB frame is set to one since there was at least one link data block preceding the response frame.

FIG. 6 shows two examples transferring multiple link data frames. In the first example, a write operation transferring two link data blocks is performed by the command originator. As in the single link data block example, the MCB frame 602 and the first link data block frame 604 are sent by the originator. This first link data block frame 604 has its A bit set to one indicating that more link data block frames are to follow. The recipient system processes the first data frame and moves its contained data block to its main memory, explained in detail below, freeing the buffer area for the receipt of the next link data block in the next data frame. Then, the recipient sends an acknowledge (ACK) frame 606 to the originator system to indicate the last frame was successfully received. The ACK frame contains no information field 306, and its LC word identifies the buffer set. The originator system responds to the ACK frame by sending the next (and last) link data block (DATA) frame 608. The A bit in this DATA frame is set to zero because no more link data blocks frames are to follow. After the recipient processes the request and its associated data, it sends a response, an MRB frame 610. The MRB frame has the A bit off as in the single link data block write example.

The second example in FIG. 6 is a read operation transferring two data frames, each containing a data block, from the recipient system to the originator system. The originator system starts by sending an MCB frame 612. The recipient responds by returning a link data block frame (DATA) 614. The A bit in this DATA frame is on indicating at least another data block frame is to follow. After the originator receives and moves the link data block to its main memory, the buffer area is free for the receipt of the next link data block of a next frame. The originator sends an acknowledge (ACK) 616 to indicate the last data frame was successfully received. (ACK frame 616 is similar to the ACK frame 606 used in the write case.) The recipient responds to the ACK by sending the next link data block frame (DATA) 618 to the originator system. The A bit in this DATA frame is off indicating it contained the last link data block. After the recipient has sent the DATA frame, it sends a response (MRB) frame 520. The A bit in this MRB frame is set to one since at least one link data block preceded the response.

It is to be understood that while only one operation using a single buffer set is shown in the examples of FIGS. 5 and 6, multiple buffer sets may be used by the link at the same time, and that the traffic on the link may interleave frames sent to multiple buffer sets.

Figure 7:
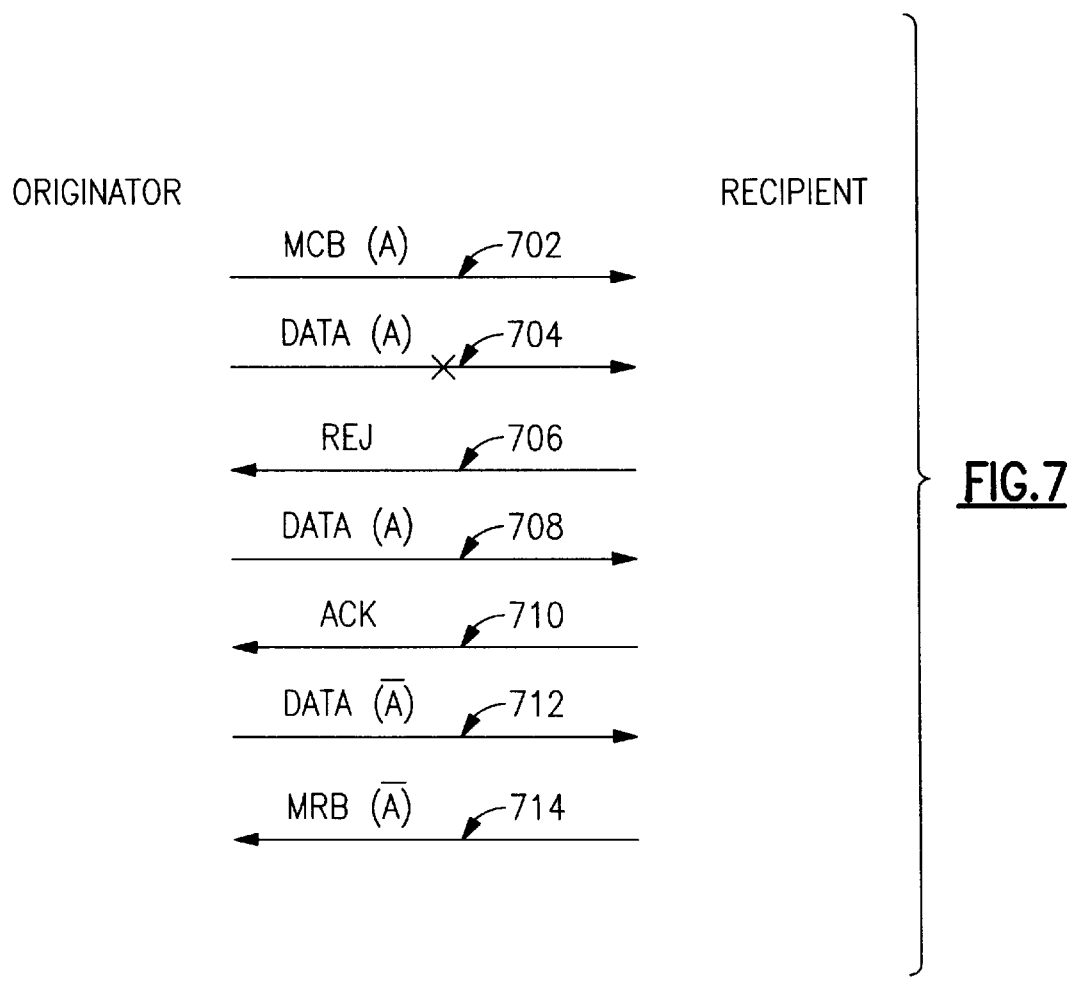
FIG. 7 is an representation of a sequence of frame exchanges in which one of the data frames has a transmission error.

Returning to FIG. 3, the LC word 302 and the information field 306 have independent error checking for a frame. This checking is provided by the encoding of the data for serial transmission (the 8 bit/10 bit code), and by the CRC fields 304 and 308. Transmission errors usually affect only a few bits at a time and it is unlikely that a transmission error would damage both the LC word 302 and the information field 306 of the same frame. If the LC word is in error, the entire frame is considered lost since the receiver does not know anything about the frame such as the frame type and the buffer set number. If the LC word is not in error and only the information field is in error, the LC word provides the receiver of the damaged frame with enough information to ask the sender to retransmit the damaged frame. Since the information field is usually much longer than the LC word, there is a higher chance that a transmission error will affect the information field and not the LC word. This means that most transmission errors affecting a frame can be retried using the information supplied by the LC word. FIG. 7 shows a write operation with an error in a link data block frame (DATA) 704. The recipient detects the error and sends a Reject frame (REJ) 706 back to the originator requesting the link data block to be retransmitted. Then the originator system resends the link data block 708.

Figure 8:
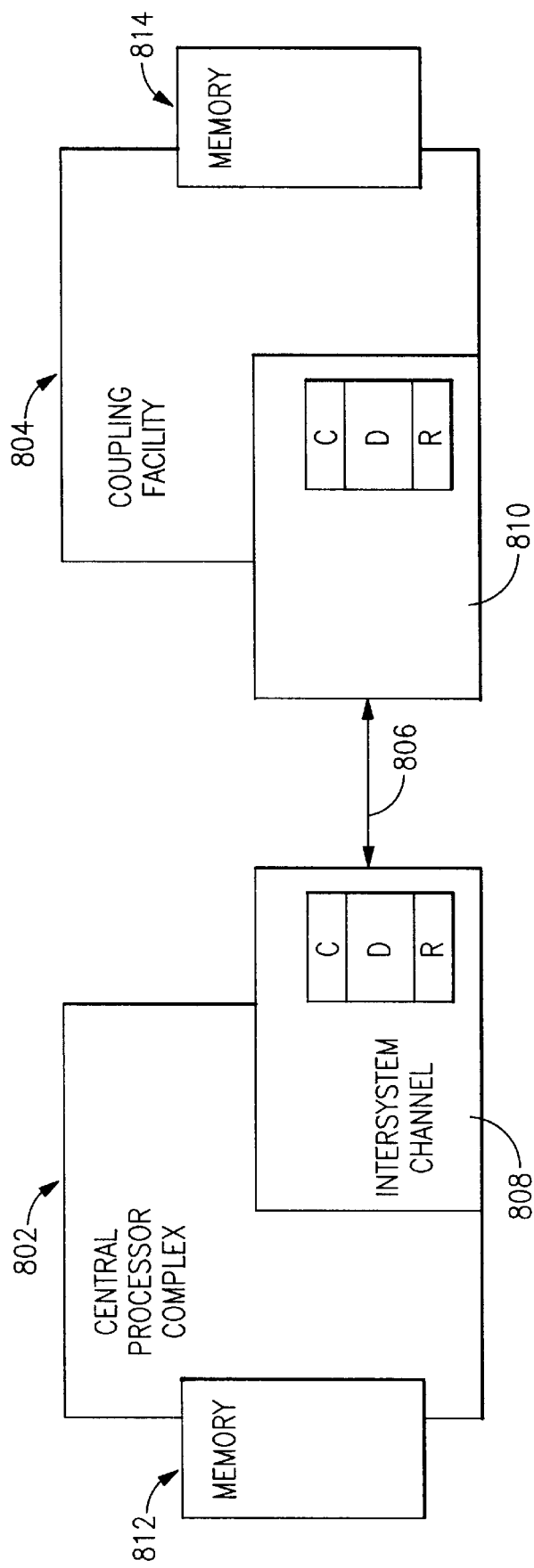
FIG. 8 is an illustration of a central processing complex (a commanding system) connected to a coupling facility (a commanded system)

FIG. 8 shows a central processor complex 802 (commanding system) connected to a coupling facility 804 (commanded system) by an intersystem channel link 806. The central processor complex 802 contains a "Sender" intersystem channel 808 that provides its connection to the intersystem channel link 806. The coupling facility contains a "Receiver" intersystem channel 810 that provides its connection to the intersystem channel link. Both the central processing complex 802 and the coupling facility 804 contain respective memories 812, 814.

DESCRIPTION OF THE CENTRAL PROCESSING COMPLEX

Figure 9:
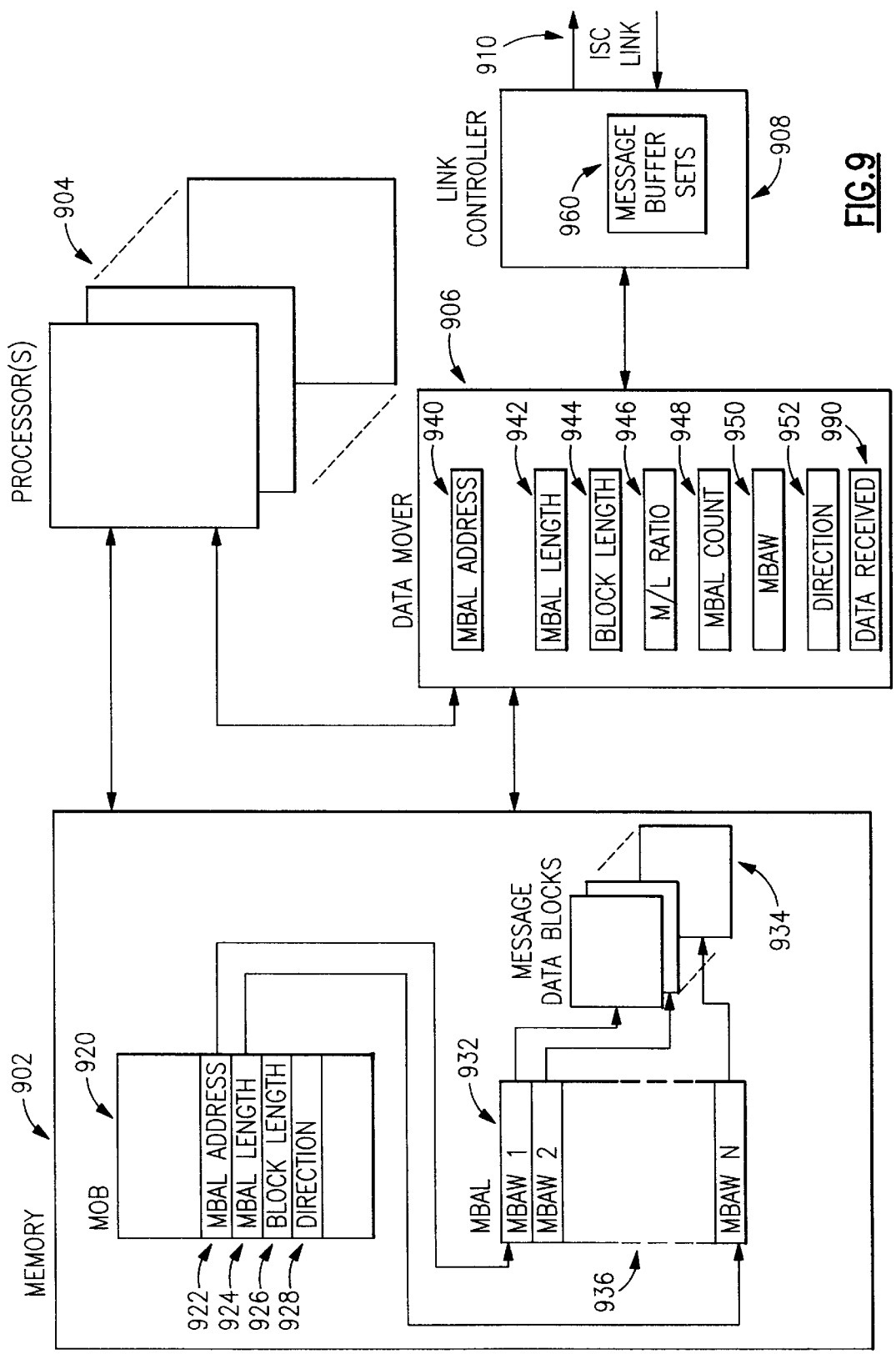
FIG. 9 is an illustrates internals of the central processing complex showing control blocks, data blocks, and link hardware used in message passing on a link.

Now that the link protocols used to transmit messages between computers have been described, we now turn to explaining pertinent details of the central processing complex (CPC), which contains a plurality of processors 904 which share a main storage (memory 902). FIG. 9 shows the internals of the central processing complex with memory 902 connected to processors 904 which may be either CPUs (central processor units) or SAPs (supporting auxiliary processors). The intersystem channel (ISC) includes the data mover 906 which is connected to both the memory 902 and processors 904. The data mover 906 is also connected to the link controller 908, and to a hardware intersystem channel link 910 which connects to a coupling facility.

Programs in the CPC send commands to the coupling function by using the SEND MESSAGE instruction. Before the SEND MESSAGE instruction is executed, a CPC program sets up its control blocks and data blocks in memory 902. One of these control blocks is a message operation block (MOB) 920 which contains a sequence of entries, including an address (MBAL ADDRESS) 922 of another control block called a message block address list (MBAL) 932. Other entries in MOB 920 also include: the length of the MBAL (MBAL LENGTH field 924), the length of each message data block (BLOCK LENGTH field 926), and the direction of data transfer (DIRECTION field 928).

The MBAL 932 contains a list of sequential entries 936 which contain the addresses of message data blocks 934, herein called message block address words (MBAWS) 936. Each MBAW locates a storage block anywhere in memory 902. In the present embodiment, the MBAL may be loaded with up to 16 entries (the MBAL may have any number of entries). Each message data block 934 may be 256, 512, 1024, 2048, or 4096 bytes in length (each a power of two).

After the control blocks and data blocks have been set up, the CPC program code issues the SEND MESSAGE instruction (which is an instruction known in the prior art). A CPC processor executes the SEND MESSAGE instruction having parameters and other operand information in memory (not shown) which are sent to an intersystem channel port and buffer set. A "data structure identifier" (structure ID) is included in the MCB to inform the commanded system (a coupling facility) of the particular data structure which is to be the subject of a data transmission started by the SEND MESSAGE instruction. The combination of intersystem channel port and buffer set is called a path. Once the path has been chosen, the command is sent to the CPC data mover 906 instructing it to transmit an MCB (not shown) through the link controller 908 and over the link 910. The general operation of the SEND MESSAGE command for sending a MCB (message control block) to a coupling facility is known in the prior art.

Next, the CPC processor sends another command, called a list command, to data mover 906 instructing it to transfer the message data blocks over the link. The list command instruction microcode gathers several parameters from the MOB 920 to send to hardware registers in data mover 906, including the MBAL ADDRESS 922 which is sent to an MBAL address register (MBAL ADDRESS) 940, the MBAL LENGTH 924 which is sent to an MBAL length register (MBAL LENGTH) 942, the BLOCK LENGTH 926 which is sent to a block length register (BLOCK LENGTH) 944, and the DIRECTION bit 928 which is sent to a direction bit register (DIRECTION) 952. Now the data mover has the information required to automatically send all of the message data blocks associated with the SEND MESSAGE instruction without any assistance from the CPC processor.

In the described embodiment, the CPC's message data block length is made the same as the link block length in the information field(s) of each data frame, although this invention allows the link block length to be any value and prefers a power of two value. Since the length of the message block and link data blocks (data frames) are each chosen to be the same length in the CPC. Thus in this detailed embodiment, a one value is chosen for a CPC M/L ratio value, which is the ratio of the CPC block length to the link block length. So, in the central processing complex, the processor sets a one value in an M/L RATIO register 946 in mover 906.

As we will show later, a coupling facility data mover 1006 at the other end of the link may handle and store data CF memory blocks with lengths different from the CPC memory blocks and the CF may use a CF S/L ratio different from the CPC M/L ratio.

A CPC write command is specified to the CPC data mover 906 by the on state of a bit set into a DIRECTION bit register 952, indicating that data frame(s) for this command are to be sent from the central processing complex to the coupling facility and to be written in the CF memory as a data structure. The top half of FIG. 6 represents a write operation transmitting two data block frames to the CF. As previously explained, the command is started by sending an MCB 602 over the link which contains the structure ID for the structure which is to be sent. The next sent frame is the first data frame 604. Before sending the first data frame, the data mover 906 fetches from the CPC memory 902 the first data block to be sent in the first data frame 604 by using the current content of the MBAL ADDRESS register 940 which was loaded with MBAL address 922. The MBAL address is used to fetch the first MBAW 932 and load it into MBAW register 950. Then the MBAL ADDRESS register 940 is incremented to the position of the next MBAW address in the MBAL 932. In the present embodiment, each data block address is eight bytes, so the MBAL ADDRESS register is incremented by eight. The data mover 906 also decrements an MBAL LENGTH register 942 by one, which maintains a count of the remaining MBAWs to be used for the structure transmission. Since in this example, two data blocks are transmitted, the MBAL LENGTH register 942 was set to two by the action of the list command. After decrementing the MBAL LENGTH register 942, it has a value of one. The data mover 906 then places the next MBAW 936 into the MBAW register 950 and uses the contents of this register to fetch a message data block 934 from memory. When the message data block 934 arrives, the data mover 906 examines the contents of the MBAL LENGTH register 942 to determine if this is the last message data block to be transmitted for the data structure.

Since the contents of the MBAL LENGTH register 942 is not yet zero in this example, this is not the last data block, and the A bit is set to one in the first data frame used to transmit the first fetched message data block. After the data mover 906 determines the setting of the A bit, it is sent with the other frame information along with the data block to the CPC link controller 908. The link controller then sends the data frame 604 over link 910 to the CF.

After the data mover 906 sends the data block, it uses the contents of the MBAL ADDRESS register 940 to fetch the next MBAW 936. When the content of the MBAL LENGTH register 942 is zero, this is the last data block to be sent, and the MBAL ADDRESS register 940 is not incremented. Otherwise, the address in the MBAL ADDRESS register 940 is again incremented to the position of the next MBAW 936 in the MBAL 932, and the MBAL LENGTH register 942 is decremented by one. The data mover 906 then places the fetched MBAW 936 into the MBAW register 950 and waits for an ACK/REJ signal from the link controller 908.

If the ACK 606 is received from the coupling facility, the link controller 908 generates a signal to the data mover 906 instructing it to send the next data frame. The data mover 906 uses the contents of MBAW register 950 to fetch the next message data block 936 from memory. When the message data block 934 arrives, the data mover 906 again examines the contents of the MBAL LENGTH register 942 to determine if this (the second) is the last data block to be transmitted. In this example (two data blocks), the contents of the MBAL LENGTH register 942 is zero, and this is the last data block, so the A bit in the data frame is set to zero. After the data mover 906 determines the setting of the A bit, it sends this information along with the data block to the link controller 908. The link controller then sends the data frame 608 over link 910.

After the coupling facility receives the last data block, it acknowledges its safe arrival by sending the MRB 610 back to the central processing complex.

A CPC read command is specified to the data mover 906 by setting off the state of the DIRECTION bit 952, which requests that a structure be fetched in the CF and sent on the link as data frames to the central processing complex. The bottom half of FIG. 6 represents a read command operation having two data blocks. After the CPC MCB command frame 612 is sent over the link specifying a data structure ID for the command, the data mover 906 prepares for the receipt of the first data frame 614 by using the contents of the MBAL ADDRESS register 940 to fetch the first MBAL entry 936. The MBAL LENGTH entry 924 contains a value of two since two data frames are being transferred for a structure in this example. The address in the MBAL ADDRESS register 940 is incremented to the position of the next MBAW in the MBAL 932. The data mover 906 also decrements the MBAL LENGTH register 942 by one. After decrementing the MBAL LENGTH register 942, it has a value of one. The data mover 906 then places the fetched MBAW 936 into the MBAW register 950 and uses the contents of this register to store the message data block 934 into memory when it is received from the coupling facility.

The coupling facility sends the first data frame 614 to the central processing complex, and when the start of this data frame is received, the link controller 908 sends a signal to the data mover 906. The CPC data mover 906 responds by moving the required data block from the appropriate message buffer 960 in the link controller. This data block is then directly sent to its memory location using the address in the MBAW register 950. After all data has been successfully received from the link 910 and stored in the message data block location 934 in CPC memory, the data mover 906 sends a signal to the link controller 908. The link controller 908 then sends the ACK signal 616 to the coupling facility. After the data mover 906 sends the signal to the link controller, it prepares for the arrival of the next data block using the content of the MBAL ADDRESS register 940 containing the address of the next MBAW 936. The address in the MBAL ADDRESS register 940 is incremented to the next MBAL entry 936 in the MBAL 932, and copies its content (the next MBAW) into MBAW register 950. The data mover 906 also decrements the MBAL LENGTH register 942 by one, which now reaches zero since in this example, this is the last of the two data blocks to be received.

After the data mover 906 places the fetched MBAW 936 into the MBAW register 950, it is used to store the next message data block 934 into CPC memory when it is received from the coupling facility.

Meanwhile, when the coupling facility receives the ACK 616 from the CPC for the first data frame, the CF responds by sending the last data frame 618 to the central processing complex. When the start of this data frame is received, the link controller 908 sends a signal to the data mover 906. The data mover 906 responds by pulling the data block from the appropriate message buffer 960 in the link controller. This data block is then moved to memory using the address currently in the MBAW register 950. After all data has been successfully received from the link 910 and stored at the MBAL addresses in CPC memory, the data mover 906 examines the content of the MBAL LENGTH register 942 on each received data frame. When register 942 has a value of zero, instead of sending a signal to the link controller 908, the data mover 906 sets an internal indicator bit in a DATA RECEIVED register 990 to keep track of the fact that all of the data blocks have been successfully received for the structure.

After the coupling facility has sent the last data frame, it immediately sends the MRB 620. When the CPC link controller 908 receives the MRB, it signals its data mover 906. Since this is a read command, the data mover 906 examines its DATA RECEIVED register 990 to find if it indicates the successful arrival of all data blocks for the structure. If all data blocks were received successfully, the CPC program that originally issued the SEND MESSAGE instruction is notified.

DESCRIPTION OF THE COUPLING FACILITY

Figure 10:
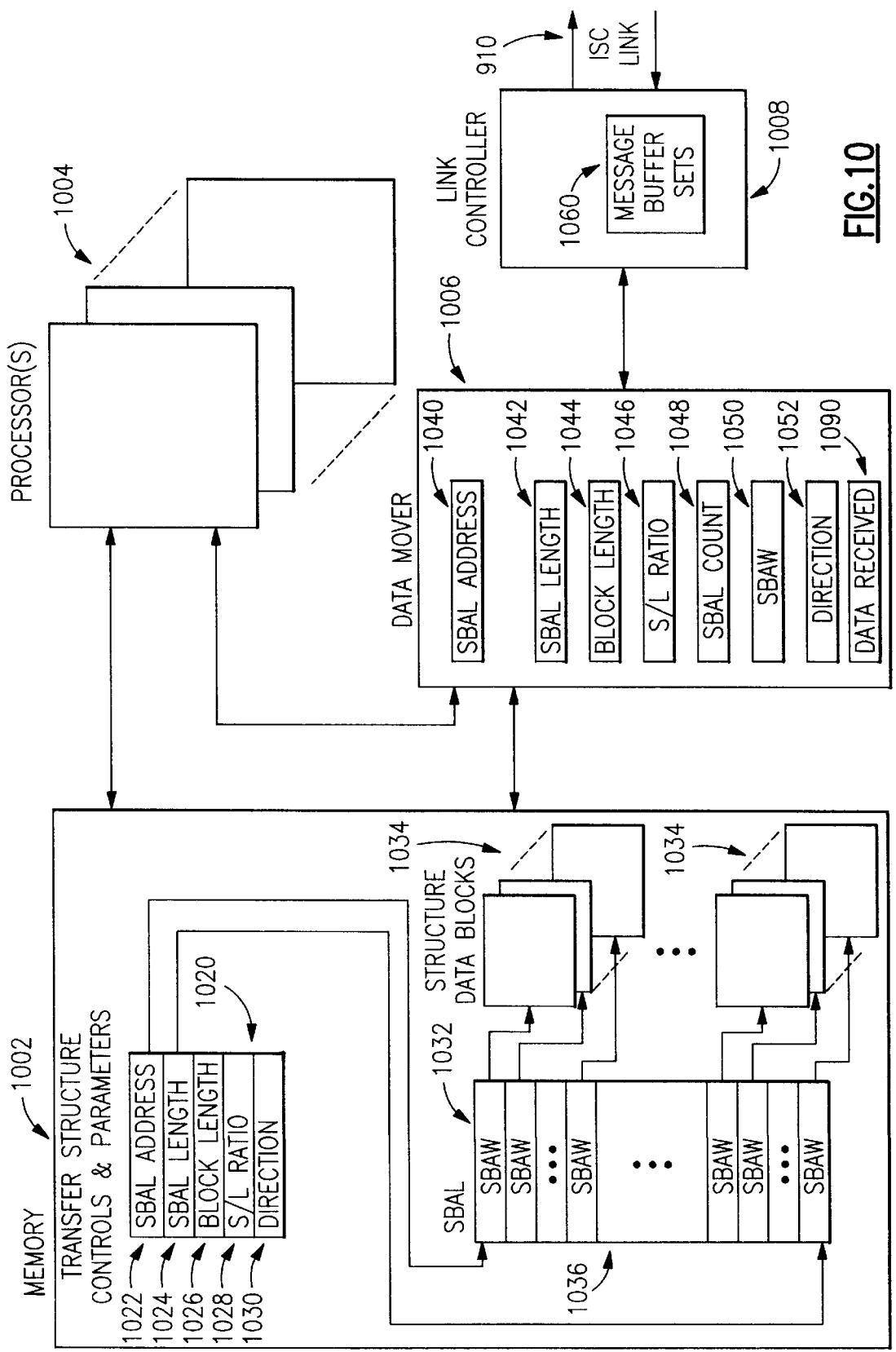
FIG. 10 is an illustration of internals of the coupling facility showing control blocks, data blocks, and link hardware used in message passing on the link.

Turning now to details of the coupling facility, FIG. 10 shows its pertinent internals which include a data mover 1006 and a link controller 1008 that are similar to mover 906 and link controller 908 at the central processing complex. A CF memory 1002 connected to one or more CF processors 1004 which may be either CPUs or SAPS. A CF intersystem channel includes the data mover 1006 which is connected to both the memory 1002 and the processor(s) 1004. The data mover 1006 is also connected to the link controller 1008. The CF is connected to the same intersystem channel link 910 to which the central processing complex is connected.

The coupling facility receives message commands (MCBs) using the LOCATE CHANNEL BUFFER processor instruction in the prior art and sends response frames containing the MRB using the SIGNAL CHANNEL BUFFER processor instruction in the prior art.

This invention provides a TRANSFER STRUCTURE instruction, which is described below to transfer all data blocks of a data structure in either direction between a CPC and CF. The TS instruction is only executed in the CF (the commanded system) in this embodiment in response to the CF receiving a SEND MESSAGE command from the CPC to transfer a structure on a link between the CPC and CF in either link direction.

After a CF processor executes coupling facility control code (CFCC) that detects an MCB has arrived, the CFCC examines the MCB to determine the type of data transfer, if any, the CF should perform. The CF will perform either a write or read command to transfer a data structure to or from the coupling facility on the link to the CPC. A data structure is a collection of equal length data blocks scattered throughout the coupling facility's memory 1002. The structure's data blocks are not contiguous in the CF memory. The MCB command frame specifies the structure ID, and the length and number of data frames in the structure to be transferred over the link. For example, the MCB frame may specify that five data frames, each 2048 bytes in length, are to be transferred for the structure. The data structure, after being deposited in the CPC and CF memories, may have a different block length and a different number of blocks in the CF memory than in the CPC memory. For example, the structure may have ten data blocks, each 1024 bytes in length in the CF memory and five data blocks, each 2048 bytes in the CPC memory.

Before the TRANSFER STRUCTURE instruction is executed, the CFCC being executed by the CF processor sets up CF control blocks and parameters in CF memory 1002. The structure's data blocks 1034 have usually been set up in advance. Some commands allocate structures and the CFCC must also set up the structure data blocks 1043. A structure block address list (SBAL) 1032 contains the addresses in the CF memory of each block in the structure. The TRANSFER STRUCTURE controls and parameters 1020 contain a plurality of entries, one entry 1022 containing the address of a structure block address list SBAL 1032. The SBAL has a plurality of entries which contain structure block address words (SBAWs) which may contain addresses of the blocks in the current structure, beginning with the first SBAW 1036. Control block 1020 also has an entry (SBAL LENGTH) 1024 containing the number of valid structure entries in the SBAL 1036, (BLOCK LENGTH) entry 1026 contains the length of each link data block or data frame length received in the CPC command frame, an entry containing a S/L RATIO 1028 (described in detail below) which is the ratio of the structure block length in the CF to link block length, and a DIRECTION entry 1030 containing an indicator of the direction of data transfer.

In the present embodiment, the SBAL can have from one to 256 entries containing valid addresses for blocks in the current structure, and BLOCK LENGTH 1026 contains the length of the information field in each frame, which can have a length of 256, 512, 1024, 2048, or 4096 bytes. Thus, different lengths and numbers of data blocks can be easily accommodated for different structures.

The S/L RATIO 1028 specifies the ratio of the structure block length to the link block length. Note that the link block length is the length of link data block in a data frame. Since the lengths of the CF structure data blocks and link frames may not be the same, the CF data mover 1006 requires the S/L ratio to determine how to package the CF blocks in each link data frame length both for normal link transfer operations, and for link error recovery operations requiring retransmission of frames.

Figure 11A:
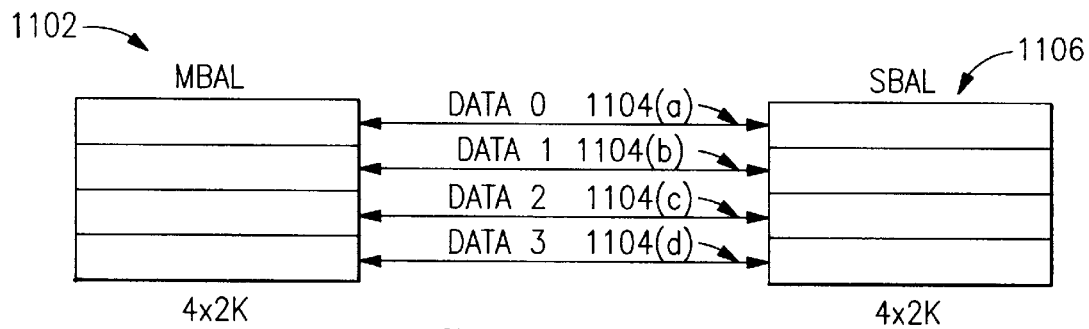
FIG. 11 is an illustration of scatter/gather of data blocks at the coupling facility when different length data blocks are accessed.

FIG. 11 shows three examples illustrating a different S/L RATIO 1028. In each of the three examples, the data structure may be transferred in either direction, from the central processing complex to the coupling facility or from the coupling facility to the central electronics complex. The simplest situation is where the S/L RATIO is equal to one as shown in FIG. 11a. In this example, the central processing complex stores four message data blocks for a CPC structure, each block containing 2048 (2K) bytes, and the coupling facility also stores four data blocks for the same structure in the CF, each block containing 2048 (2K) bytes.

Figure 11B:
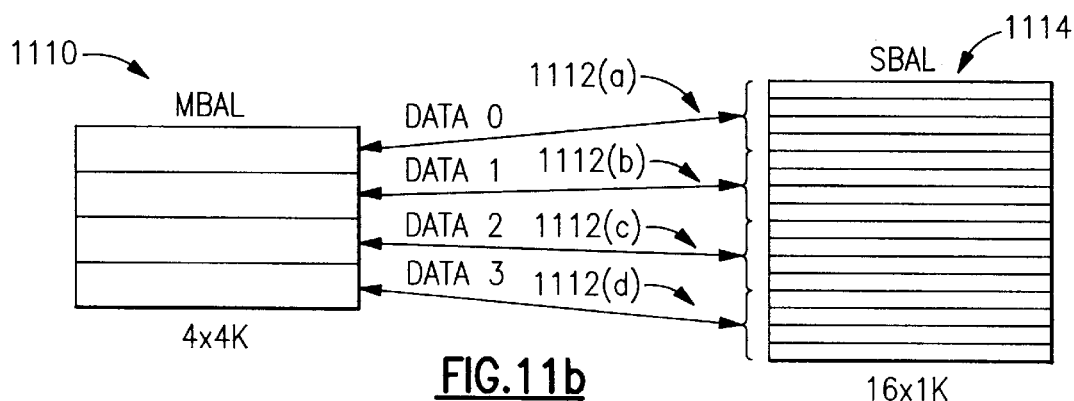

The MBAL 1102 has four entries, and since the MBAL determines how the data frames are transmitted over the link, the link has four data frames 1104a, 1104b, 1104c, 1104d. At the coupling facility, the SBAL 1106 also has four entries since the S/L RATIO is equal to one. Thus, each MBAL 1102 entry corresponds to one link frame and one SBAL 1104 entry. FIG. 11b shows an example where the S/L RATIO is four. In this example, the central processing complex is transferring four message data blocks, each containing 4096 (4K) bytes, and the coupling facility has 16 structure data blocks, each containing 1024 (1K) bytes. As in FIG. 11a, the MBAL 1110 has four entries, and since the MBAL determines how the data frames are transmitted over the link, the link has four data frames 1112a, 1112b, 1112c, 1112d. At the coupling facility, the SBAL 1114 has 16 entries making the S/L ratio equal to four. Thus, each MBAL 1110 entry corresponds to one link frame, as usual, and four SBAL 1114 entries. This example will be used in the detailed description of the coupling facility below.

Figure 11C:
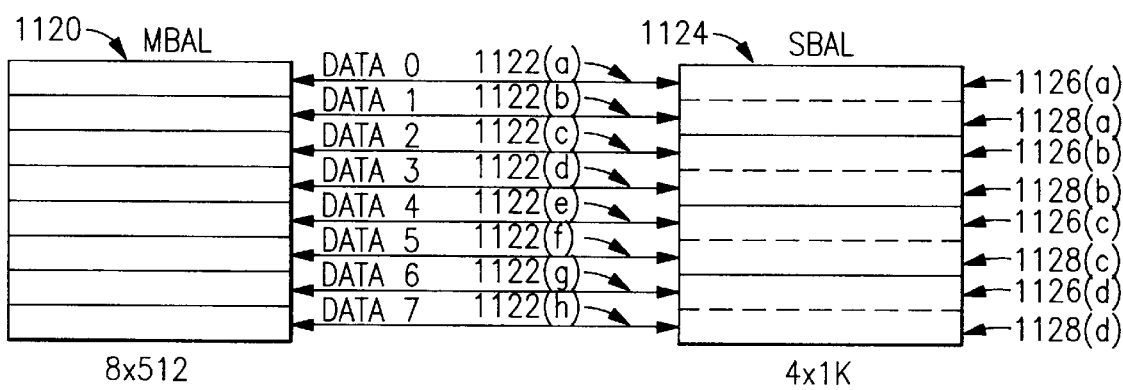

FIG. 11c shows an example where the S/L RATIO is one half (0.5). In this example, the central processing complex is storing eight data blocks for a structure, each block containing 512 bytes, and the coupling facility is storing four structure data blocks for the same structure, and each block containing 1024 (1K) bytes. The MBAL 1120 has eight entries which determines how the data frames are transmitted over the link, so the link has eight data frames 1122 (a through h). At the coupling facility, the SBAL 1124 has four entries, one for each of the four structure data blocks, making the S/L ratio equal to one half (0.5). Thus, each MBAL 1120 entry corresponds to one link frame, and two frames are received at the CF for each of its SBAL 1124 entries.

In FIG. 11c, eight SBAL entries are passed to the data mover 1006 to store each of the received eight data frames. Then for each of the four CF data blocks, two SBAL entries 1032 are used. The first entry for each of the four structure data blocks 1126a, 1126b, 1126c, 1126d, is the starting address of each CF data block while the second entry for each of the four structure data blocks 1128a, 1128b, 1128c, 1128d is generated by adding the link block length (or data frame length) to the starting addresses of the structure data blocks.

In the above examples, only integral, powers of two S/L RATIOs have been shown. While limiting the S/L ratio to these values simplifies the present embodiment, the invention may operate with any value for the S/L ratio.

The TRANSFER STRUCTURE instruction operates as follows in the coupling facility in FIG. 10: After the CFCC generates all required control blocks, parameters, and locations of structure data blocks (i.e. 1020 and 1032 and their content for a structure), the CFCC issues the TRANSFER STRUCTURE instruction. The code in the processor that executes the TRANSFER STRUCTURE instruction sends a command, called a list command, to the data mover 1006 instructing it to transfer the structure data blocks over the link in the direction indicated in DIRECTION register 1052. The TRANSFER STRUCTURE instruction uses the list command to send parameters to the data mover 1006 from the entries in the TRANSFER STRUCTURE CONTROLS AND PARAMETERS 1020. This includes sending the SBAL ADDRESS 1022 to the SBAL address register (SBAL ADDRESS) 1040, sending the SBAL LENGTH 1024 to the SBAL length register (SBAL LENGTH) 1042, sending the BLOCK LENGTH 1026 to the block length register (BLOCK LENGTH) 1044, sending the S/L RATIO 1028 to the S/L RATIO register 1046, and sending the DIRECTION bit 1030 to the direction bit register (DIRECTION) 1052. Now the data mover has the information required to automatically send all of the structure data blocks associated with the TRANSFER STRUCTURE instruction without any assistance from the CF processor.

Using the block lengths shown in FIG. 11b, both a read and write operation are described: During a write operation, as specified to the data mover 1006 in the DIRECTION bit 1052, data frames are sent from the central processing complex to the coupling facility. After the MCB is sent over the link, the first data frame 1112a is received. After receiving the list command, the data mover 1006 initializes the SBAL COUNT register 1048 to the value in the S/L RATIO register 1046. The data mover 1006 then uses the content of the SBAL ADDRESS register 1040 to fetch the first SBAW 1036. The address in the SBAL ADDRESS register 1040 is incremented to the position of the next address in the SBAL 1032. As with the MBAL ADDRESS register 940 in the central processing complex, each structure data block address is eight bytes, so the SBAL ADDRESS register 1040 is incremented by eight. The data mover 1006 also decrements the SBAL LENGTH register 1044 by one and decrements the SBAL COUNT register 1048 by one. Since in this example, the S/L RATIO is four and there are four link data blocks (or data frames) to be transferred, the value in the MBAL LENGTH register 1042 is now 15 and the value in the SBAL COUNT register 1048 is now 3. The data mover 1006 then places the fetched SBAW 1036 into the SBAW register 1050 and waits for a signal from the link controller 1008.

When the start of first data frame 1112a arrives from the central processing complex, the link controller 1008 sends a signal to the data mover 1006. The data mover 1006 responds by starting to pull the data frame from the appropriate message buffer 1060 in the link controller 1008. The data mover 1006 uses the address in the SBAW register 1050 to start storing the first data frame 1112a into the coupling facility memory. The amount of data stored into the structure data block 1034 is calculated by the data mover 1006 by dividing the content of the BLOCK LENGTH register 1044 by the content of the S/L RATIO register 1046. In this example, the content of the BLOCK LENGTH register 1044 is 4096 and the content of the S/L RATIO register is 4. The calculated length of each structure data block is therefore 1024. Since in the preferred embodiment the sizes of all blocks are powers of two, the data mover 1006 can easily make these calculations. After the structure data block 1034 has been stored into the coupling facility memory 1002, the data mover 1006 uses the content of the SBAL ADDRESS register 1040 to fetch the next SBAW 1036. The address in the SBAL ADDRESS register 1040 is again incremented to the position of the next address in the SBAL 1032, and the SBAL COUNT register 1048 is again decremented by one. The SBAL COUNT register 1048 now has a value of 2. The data mover 1006 then places the fetched SBAW 1036 into the SBAW register 1050 and uses the contents of this resister to continue storing the first data frame 1112*a* into the coupling facility memory 1002.

This process continues as the data frame 1112*a* is being received from link controller 1008 and being stored in CF memory 1002. When the value in the SBAL COUNT register 1048 reaches zero and the data frame has been successfully stored into the first four structure data buffers 1034, the data mover 1006 sends a signal to the link controller 1008, and the link controller 1008 then sends an ACK frame to the central processing complex.

After the data mover 1006 sends the ACK signal to the link controller 1008, it prepares for the arrival of the next data block using the content of the SBAL ADDRESS register 1040 to fetch the next SBAW 1036 and initializes the SBAL COUNT register 1048 to the value in the S/L RATIO register 1046 (again, four in this example). The address in the SBAL ADDRESS register 1040 is incremented to the position of the next address in the SBAL 1032. The data mover 1006 also decrements the SBAL LENGTH register 1042 by one and decrements the SBAL COUNT register 1048 by one. Since in this example, the S/L RATIO is four and the data mover 1006 is preparing for the receipt of the second of four link data blocks (or data frames), the value in the MBAL LENGTH register 1042 is now 11 and the value in the SBAL COUNT register 1048 is now 3. The data mover 1006 then places the fetched SBAW 1036 into the SBAW register 1050.

Meanwhile, the CPC receives the ACK signal and responds by sending the second of four data frames 1112*b* to the coupling facility. When the start of the data frame is received, the link controller 1008 sends a signal to the data mover 1006, and the storing of the next data frame continues as illustrated above with the receipt of the first data frame 1112*a*.

When the last structure block 1034 of the last data frame 1112*d* is processed by the data mover 1006, the value in the SBAL LENGTH register 1042 reaches zero, and the link controller waits until all of this last structure data block 1034 is successfully received and stored into the coupling facility memory 1002. Since the value in the SBAL LENGTH register 1042 is now zero, the data mover stores an indicator in the coupling facility memory alerting the CFCC that all of the structure data blocks 1034 have been received. After the TS instruction's write operation is complete, the CFCC sends an MRB frame to the central processing complex to indicate the conclusion of the CPC write command.

A CPC read command is likewise indicated by the setting of DIRECTION bit 1052, and data frames are sent from the coupling facility to the central processing complex. After the MCB frame has been received by the CF, and processed by the CFCC, the CFCC issues the TRANSFER STRUCTURE instruction and it executes the list command to send control information entry contents from control blocks 1020 and 1032 to the data mover 1006; wherein the data mover has its registers initialized in the manner previously explained for the CPC write command operations.

Since in this read operation example, the S/L RATIO is also four, and there are four link data blocks (or data frames) to be transferred, the value in the MBAL LENGTH register 1042 is now 15 and the value in the SBAL COUNT register 1048 is now 3. The data mover 1006 then places the fetched SBAW 1036 into the SBAW register 1050 and fetches the first structure data block 1034 from the coupling facility memory 1002. When the structure data block 1034 arrives, the data mover 1006 examines the contents of the SBAL LENGTH register 1042 to determine if this is the last data frame to be transmitted. Since the content of the SBAL LENGTH register 1042 is not less than the content of the S/L RATIO register 1046 (the SBAL LENGTH register 1042 has a value of 15 and the SBAL COUNT register 1048 has a value of three), this is not the last data frame, and the A bit in the data frame is set to one. The data mover 1006 also uses the value in the BLOCK LENGTH register 1044 to set the Count 412 value in the link-control word 302. After the data mover 1006 determines the setting of the various fields in the link-control word 302, it sends this information along with the data block to the link controller 1008.

The CF link controller 1008 then starts to send the data frame 1112*a* over link 1010. As soon as the data mover 1006 finishes sending the first structure data block 1034 to the link controller 1008, it fetches the next structure data block 1034 using the address in the SBAL register 1050. The address in the SBAL ADDRESS register 1040 is incremented again to the position of the next address in the SBAL 1032. The data mover 1006 also decrements the SBAL LENGTH register 1044 again by one and decrements the SBAL COUNT register 1048 by one. In this example, the value in the MBAL LENGTH register 1042 is now 14 and the value in the SBAL COUNT register 1048 is now 2. The data mover 1006 then places the fetched SBAW 1036 into the SBAW register 1050 and fetches the second structure data block 1034 from the coupling facility memory 1002. This structure data block 1034 is sent to the link controller 1108 to continue its transmission of the data frame. This process of fetching structure data blocks continues until the value in the SBAL COUNT register 1048 reaches zero, and all four (in this example) structure data blocks have been sent to the central processing complex as a single data frame 1112*a*. The data mover now waits until a signal is received from the link controller 1008 telling it to proceed with the next data frame.

Meanwhile, after the central processing complex has successfully received and stored the first data frame 1112*a*, it sends an ACK back to the coupling facility. When the link controller 1008 receives the ACK, it sends a signal to the data mover 1006 to send the next data frame. The data mover starts moving the next data frame 1112*b* by fetching the structure data block 1034 from the coupling facility memory 1002, and the process continues as it did when sending the first data frame 1112*a*.

When the data mover 1006 prepares to send the last data frame 1112*d*, it examines the contents of the SBAL LENGTH register 1042 to determine if this is the last data frame to be transmitted. Since the content of the SBAL LENGTH register 1042 is less than the content of the S/L RATIO register 1046 (the SBAL LENGTH register 1042 has a value of three and the S/L RATIO register has a value of four), this is the last data frame, and the A bit in the data frame 1112*d* is set to zero. After the data mover 1006 determines the setting of the various fields in the link-control word 302, it sends this information along with the structure data block 1034 to the link controller 1008. The link controller then starts to send the last data frame 1112*d* over link 1010.

When the last data block 1034 of the structure in the last data frame 1112*d* has been sent to the link controller 1008, the value in the SBAL LENGTH register 1042 reaches zero, and the data mover 1006 stores an indicator in the coupling facility memory alerting the CFCC that all of the structure blocks 1034 have been sent. The CFCC concludes the read operation by sending an MRB frame to the central processing complex.

DESCRIPTION OF RECOVERY FROM LINK BIT ERRORS

Figure 12:
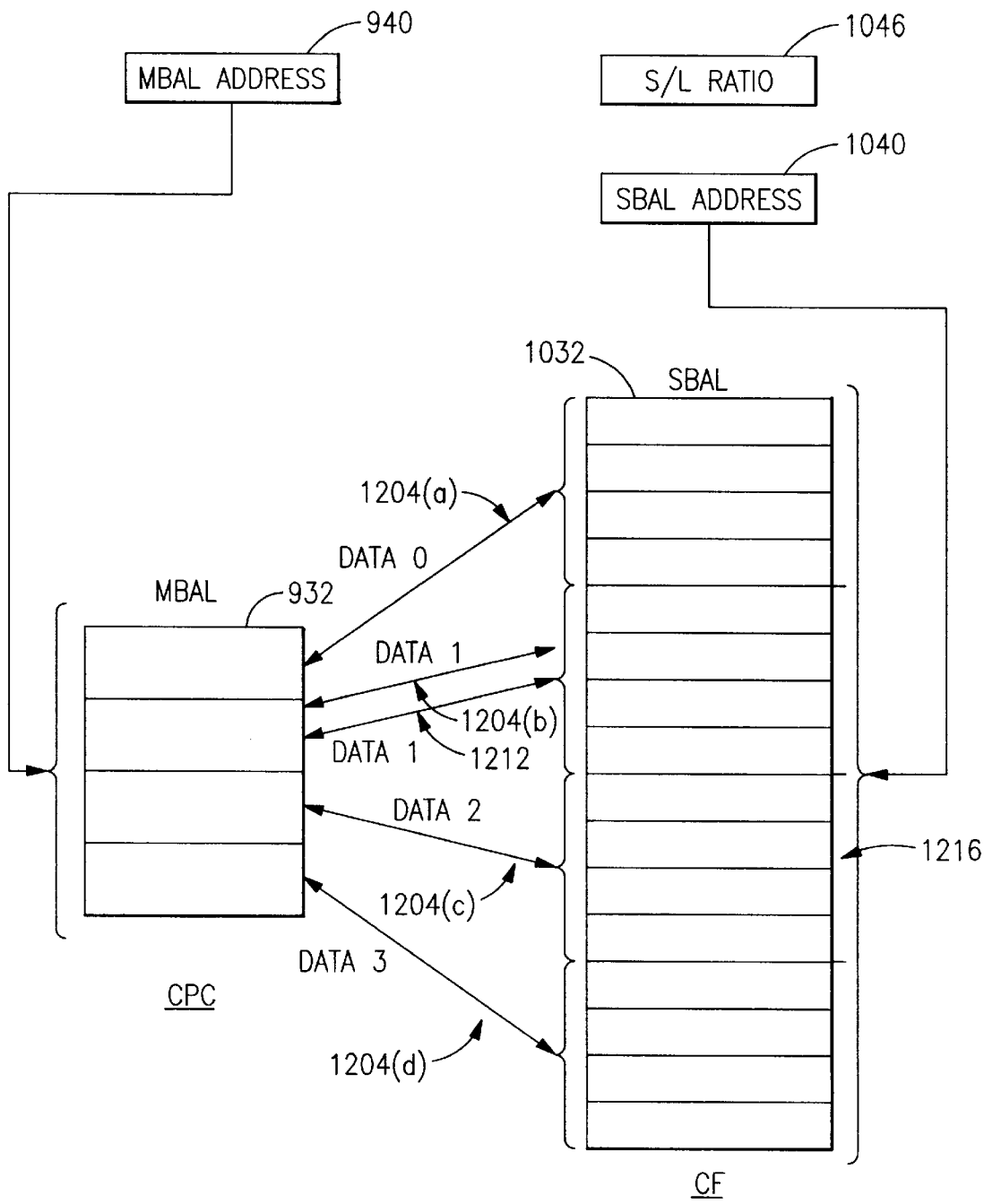
FIG. 12 in an illustration of a communication failure due to a link bit error in a data frame requiring a recovery operation.

FIG. 7 shows a link error detected in a data frame 704, causing a reject signal 706 to be sent back to the sender of the data frame, and the entire data frame 708 is resent on the link. FIG. 12 shows how the MBAL ADDRESS register 940 (the same register as the MBAL ADDRESS register 940 in FIG. 9) and the SBAL ADDRESS register 1040 (the same register as the SBAL ADDRESS register 1040 in FIG. 10) are controlled during the damaged data frame recovery procedure. The sequence shown in FIG. 12 is the same sequence as shown in FIG. 11b; however, a link error is introduced in the second data frame 1204b (the same frame as data frame 1112b in FIG. 11).

To illustrate the recovery procedure, consider a write operation where data frame 1204b is being sent from the central processing complex to the coupling facility. As the data frame 1204b is being received, it is being stored into the coupling facility memory 1002. The link error may be detected at any point in the reception of the data frame 1204b, so the SBAL ADDRESS 1040 may have several different values at the time the error is detected depending on where within the data frame the error is detected. When the link controller 1008 detects the error, it finishes sending the data frame to the data mover 1006, and the data mover 1006 finishes storing the data frame into the coupling facility memory 1002.

Note that since the error may be detected anywhere within the data frame 1204b, the data mover 1006 may be stopped at any time during the storing of the data frame 1204b, including at the end of the data frame 1204b. No matter where the error is detected, the data mover 1006 sends a signal to the link controller 1008 after all of the data is successfully stored into the coupling facility memory 1002.

After the link controller 1008 receives the signal from the data mover 1006 indicating that it has finished storing the damaged data frame 1204b, the link controller 1008 sends a reject (REJ 706) frame back to the central processing complex. Normally, in the absence of link errors, the link controller 1008 sends an ACK back the central processing complex. At the central processing complex, reception of the REJ frame 706 causes its link controller 908 to send a signal to its data mover 906 instructing it to resend the last data frame 1212 to the coupling facility. At the central processing complex, calculating the correct MBAL address is simple since the CPC M/L RATIO 946 is one. When the data mover 906 receives the resend signal from the link controller 908, it backs up the MBAL ADDRESS register 940 by exactly one position, refetches the MBAW 936, refetches the message data block 934, and sends it over the link 910 to the coupling facility.

The recovery procedure at the coupling facility is more complex since the CF S/L ratio is 4 (and therefore is not the same as the CPC M/L ratio of one). The SBAL ADDRESS register 1040 may have any of the values used to receive the damaged data frame 1204b. When the beginning of the resent data frame 1212 is received by the link controller 1008, it sends a signal to the data mover 1006 instructing it to store the last data frame again. When the data mover 1006 receives this signal, it must first back up the SBAL ADDRESS register 1040 to the beginning of the last data frame 1204b received. In the general embodiment, this procedure of backing up the SBAL ADDRESS register 1040 requires that the data mover 1006 keeps a pointer to the beginning of the last of data frame received for the last block 1216, so that it can use this value in case the recovery signal is received from the link controller 1008.

In this embodiment with block sizes limited to powers of two, the data mover 1006 uses to value in the S/L RATIO register 1046 to back up the SBAL ADDRESS register 1040.

Further, by assigning addresses to the SBAL 1032 itself to keep the entire SBAL 1032 within powers of two address boundaries, the data mover simply has to reset the appropriate number of low order (least significant) SBAL ADDRESS register 1040 bits as determined by the S/L RATIO register 1046 to properly back up the SBAL ADDRESS register 1040—which show the extra efficiency gained by using a power of two block length. In this example, if each SBAL 1032 entry is 8 bytes, the SBAL ADDRESS register is a byte address register, and the S/L RATIO is four; resetting the five low order address bits backs up the SBAL ADDRESS register to the beginning of the position of the last damaged data frame. After the SBAL ADDRESS register 1040 is properly backed up, the SBAW 1036 is fetched and the data transfer continues normally.

The recovery procedure during a read operation is similar the write case. In the read case, the data mover 1006 in the coupling facility is signaled by the link controller 1008 to resend the last data frame, and the link controller 906 in the central processing complex is signaled by the link controller 908 to receive the last data frame again.

While we have described our preferred embodiments of our invention, it will be understood that those skilled in the art, both now and in the future, may make various improvements and enhancements which fall within the scope of the claims, which follow. These claims should be construed to maintain the proper protection for the invention first disclosed herein.

Having thus described our invention, what we claim as new and desire to secure by Letters Patent is:

1. A method of transferring a data structure using a plurality of frames over an intersystem link connected between a commanding computer (commanding entity) and a commanded computer (commanded entity) in either direction by performing read and write operations for the data structure at opposite ends of the intersystem link, the data structure being storable in noncontiguous blocks in a computer storage at each entity, the method comprising the steps of:

sending a message command from the commanding entity to the commanded entity for requesting a transmission of a data structure on the link in either direction by transmitting a message control block over the link to the commanded entity indicating the direction of transfer and containing a data structure identifier (structure ID) to identify to the commanded entity the data structure to be transferred, specifying for each entity a particular frame size for frame data to be transmitted for the storage blocks for the data structure, and indicating for each entity a predetermined frame-to-block ratio for the blocks of the data structure, wherein the frame-to-block ratio enables each entity to determine the number of frames stored in each storage block of the data structure at each entity, executing microcode within the commanded entity for preparing and initiating execution of a transfer data structure (TS) instruction, and executing the TS instruction to efficiently control movement of data for the identified data structure between a link buffer and blocks of the data structure in a memory of the commanded entity as data frames transmit the data structure on the link, sending on the link by the receiving entity to the sending entity an acknowledge frame or a reject frame to indicate to the sending entity if a last transmitted frame was received error free or with an error condition, responding to a received acknowledge frame by the sending entity sending on the link a next data frame for the data structure, each frame containing a link control word (LCW) for controlling the transmission of each next frame in the data structure, an A bit in the LCW controlling a sequencing of the frames in each data structure being transmitted on the link, the A bit indicating the end of each data structure being transmitted, and responding to a received reject frame by the sending entity re-transmitting on the link a last transmitted frame retained in a link buffer of the sending entity associated with the reject frame.

2. A method of transmitting a data structure between a commanding entity and a commanded entity in either direction over an intersystem link, as defined in claim 1, a sending entity being either the commanding or commanded entity sending the structure as frames on the link, and a receiving entity being the other of the commanding or commanded entity receiving the frames of the structure from the link, further comprising the steps of:

inhibiting the overlaying of data in the link buffer of the sending entity until an acknowledge signal is received on the link from the receiving entity that the data frame was received by the receiving entity without error.

3. A method of transmitting a data structure between a commanding entity and a commanded entity in either direction over an intersystem link, as defined in claim 2, a sending entity being either the commanding or commanded entity sending the structure as frames on the link, and a receiving entity being the other of the commanding or commanded entity receiving the frames of the structure from the link, further comprising the steps of:

sizing the link buffer and each of the data blocks of the structure in the commanded entity to be a number of bytes equal to a power of two, of which the size of the link buffer and of each block have an integer predetermined ratio.

4. A method of transmitting a data structure between a commanding entity and a commanded entity in either direction over an intersystem link, as defined in claim 1, a sending entity being either the commanding or commanded entity sending the structure as frames on the link, and a receiving entity being the other of the commanding or commanded entity receiving the frames of the structure from the link, further comprising the steps of:

the commanding entity being a central processing complex, and the commanded entity being a coupling facility comprised of a processor and a very large electronic storage.

5. A method of transmitting a data structure between a commanding entity and a commanded entity in either direction over an intersystem link, as defined in claim 1, a sending entity being either the commanding or commanded entity sending the structure as frames on the link, and a receiving entity being the other of the commanding or commanded entity receiving the frames of the structure from the link, further comprising the steps of:

signaling by one of the commands of the commanding entity to the commanded entity a set of parameters including a parameter indicating a size in storable data units for the identified structure to be transmitted over the intersystem link, accessing by the commanded entity of a pointer list representing locations of data blocks of predetermined size containing the data structure in the memory of the commanded entity, and utilizing pointers in the pointer list for addressing data blocks of the structure which may be scattered in the memory of the commanded entity until a last block is transmitted error free for the structure.

6. A method of transmitting a data structure between a commanding entity and a commanded entity in either direction over an intersystem link, as defined in claim 1, a sending entity being either the commanding or commanded entity sending the structure as frames on the link, and a receiving entity being the other of the commanding or commanded entity receiving the frames of the structure from the link, further comprising the steps of:

responding to a reject frame received by the commanded entity by retransmitting a plurality of last transmitted frames for one or more storage blocks in the commanded entity associated with the reject frame when the storage block ratio in the commanded entity indicates a plurality of frames are contained in each block in the commanded entity.

7. A method of transmitting a data structure between a commanding entity and a commanded entity in either direction over an intersystem link, as defined in claim 6, a sending entity being either the commanding or commanded entity sending the structure as frames on the link, and a receiving entity being the other of the commanding or commanded entity receiving the frames of the structure from the link, further comprising the steps of:

locating a structure pointer list of the TS instruction for addressing in the memory of the commanded entity a storage boundary having a power of two byte address containing right zeros for addressing a location for a first frame of a first block of the structure, writing or reading plural frames of each storage block of the commanded entity transmitted on the link starting at the first block location addressed by a first pointer in the structure pointer list and incrementing the address to a next frame location in the block until the end of the block is reached, and acting in the commanded entity on a a re-transmission for a current reject frame by the TS instruction resetting to a predetermined number of right zeros in the pointer address for the current block to access the location of the first data frame of the current block having the retransmission.

8. A method of transmitting a data structure between a commanding entity and a commanded entity in either direction over an intersystem link, as defined in claim 7, a sending entity being either the commanding or commanded entity sending the structure as frames on the link, and a receiving entity being the other of the commanding or commanded entity receiving the frames of the structure from the link, further comprising the steps of:

storing a location of a first pointer for each data frame in a TS instruction's pointer list, and acting for a current reject frame by resetting the current structure pointer for the TS instruction to a location in the commanded entity's memory at which each next re-transmitted block is to be accessed for writing or reading plural frames in a block of the commanded entity.

* * * * *